US012579717B2

(12) United States Patent
An et al.

(10) Patent No.: US 12,579,717 B2
(45) Date of Patent: Mar. 17, 2026

(54) SELF-SUPERVISED DEEP LEARNING IMAGE RECONSTRUCTION WITH WEIGHTED TRAINING LOSS

(71) Applicant: Washington University, St. Louis, MO (US)

(72) Inventors: Hongyu An, St. Louis, MO (US); Ulugbek Kamilov, St. Louis, MO (US); Parna Eshraghi Boroojeni, St. Louis, MO (US); Weijie Gan, St. Louis, MO (US); Jiaming Liu, St. Louis, MO (US); Yuyang Hu, St. Louis, MO (US)

(73) Assignee: Washington University, St. Louis, MO (US)

( * ) Notice: Subject to any disclaimer, the term of this patent is extended or adjusted under 35 U.S.C. 154(b) by 283 days.

(21) Appl. No.: 18/483,258

(22) Filed: Oct. 9, 2023

(65) Prior Publication Data

US 2024/0135604 A1    Apr. 25, 2024
US 2024/0355012 A9    Oct. 24, 2024

Related U.S. Application Data

(60) Provisional application No. 63/378,746, filed on Oct. 7, 2022.

(51) Int. Cl.
*G06T 11/00* (2006.01)

(52) U.S. Cl.
CPC ........ *G06T 11/006* (2013.01); *G06T 2210/41* (2013.01); *G06T 2211/441* (2023.08)

(58) Field of Classification Search
CPC ......... G06T 7/0012; G06T 2207/10088; G06T 2207/30004; G06T 5/60; G06V 10/82; G06V 2201/03
See application file for complete search history.

(56) References Cited

U.S. PATENT DOCUMENTS

| | | | | |
|---|---|---|---|---|
| 2008/0012562 A1* | 1/2008 | Beatty | ............... | G01R 33/5611 |
| | | | | 324/307 |
| 2010/0034447 A1* | 2/2010 | Geier | .................. | G01R 33/482 |
| | | | | 382/131 |
| 2017/0176563 A1* | 6/2017 | Yablonskiy | .......... | G01R 33/246 |
| 2024/0183923 A1* | 6/2024 | Cauley | ................. | G06T 11/006 |
| 2024/0362835 A1* | 10/2024 | Arberet | ............. | G01R 33/5608 |

OTHER PUBLICATIONS

Eo et al., KIKI-net: cross-domain convolutional neural networks for reconstructing undersampled magnetic resonance images,Magn Reson Med., Nov. 2018, 80(5), pp. 2188-2201, doi: 10.1002/mrm.27201.*
Zeng et al., A review on deep learning MRI reconstruction without fully sampled k-space, BMC Med Imaging. Dec. 24, 2021, 21(1):195, pp. 1-11, doi: 10.1186/s12880-021-00727-9.*

(Continued)

*Primary Examiner* — Guillermo M Rivera-Martinez
(74) *Attorney, Agent, or Firm* — Armstrong Teasdale LLP

(57) ABSTRACT

A system for image reconstruction includes an input for receiving image data, a processor, and a memory. The memory stores instructions that cause the processor to reconstruct an image from the image data using a self-supervised deep learning model.

20 Claims, 23 Drawing Sheets
(14 of 23 Drawing Sheet(s) Filed in Color)

100

(56)          References Cited

OTHER PUBLICATIONS

Knoll et al., Deep-Learning Methods for Parallel Magnetic Resonance Imaging Reconstruction: A Survey of the Current Approaches , Trends, and Issues, in IEEE Signal Processing Magazine, vol. 37, No. 1, pp. 128-140, Jan. 2020, doi: 10.1109/MSP.2019.2950640.*

Liu et al., Magnetic resonance parameter mapping using model-guided self-supervised deep learning, Magn Reson Med, Jun. 2021, 85(6), pp. 3211-3226, doi: 10.1002/mrm.28659.*

Yaman et al., Self-Supervised Physics-Based Deep Learning MRI Reconstruction Without Fully-Sampled Data, 2020 IEEE 17th International Symposium on Biomedical Imaging (ISBI), Apr. 3-7, 2020, pp. 921-925, doi: 10.48550/arXiv.1910.09116, arXiv:1910.09116.*

Gan, Weijie et al., Self-Supervised Deep Equilibrium Models With Theoretical Guarantees and Applications to MRI Reconstruction, IEEE Transactions on Computational Imaging, vol. 9, 2023, pp. 796-807.

Millard, Charles et al., A framework for self-supervised MR image reconstruction using sub-sampling via Noisier2Noise, IEEE Transactions on Computational Imaging, vol. X, 2022, pp. 1-10.

Eshraghi Boroojeni, Parna, Fast and Radiation-Free High-Resolution MR Cranial Bone Imaging for Pediatric Patients (Doctoral Dissertation, Washington University in St. Louis, Aug. 15, 2022), Chapter 3: Self-supervised and physics-guided deep learning MR reconstruction: weighting k-space sampling Density in network training Loss (weDeLo) in an unrolled network, pp. 1-23.

* cited by examiner

| Metrics | PSNR (dB) | | | SSIM | | |
|---|---|---|---|---|---|---|
| Acceleration rate | ×8 | ×6 | ×4 | ×8 | ×6 | ×4 |
| *Zero-Filled* | 22.27 | 23.40 | 26.59 | 0.771 | 0.798 | 0.861 |
| *Rank-deficient*$^{w/o}$ | 29.58 | 31.86 | 38.54 | 0.843 | 0.856 | 0.905 |
| *Rank-deficient* | 30.31 | 33.45 | 39.91 | 0.880 | 0.894 | 0.936 |
| *Full-rank*$^{w/o}$ | 29.95 | 32.73 | 38.61 | 0.861 | 0.892 | 0.922 |
| Full-rank | 31.28 | 34.14 | 41.56 | 0.903 | 0.931 | 0.951 |
| *Supervised* | 32.35 | 34.68 | 42.02 | 0.925 | 0.955 | 0.981 |

*Rank-deficient$^{w/o}$: Rank-deficient (unweighted);*
*Full-rank$^{w/o}$: Full-rank (unweighted).*

FIG. 3B

| Metrics | PSNR (dB) | | | SSIM | | | Mem[1] |
|---|---|---|---|---|---|---|---|
| Acceleration rate | ×8 | ×6 | ×4 | ×8 | ×6 | ×4 | |
| Zero-Filled | 16.86 | 17.61 | 19.30 | 0.698 | 0.735 | 0.802 | N/A |
| TV | 26.57 | 30.53 | 38.54 | 0.862 | 0.913 | 0.971 | 1745 |
| A2A | 29.80 | 31.84 | 35.03 | 0.874 | 0.903 | 0.940 | 7859 |
| SSDU | 31.10 | 32.21 | 36.43 | 0.895 | 0.920 | 0.961 | 21981 |
| SelfDU | 32.19 | 34.44 | 37.65 | 0.906 | 0.931 | 0.961 | 21981 |
| SelfDEQ$^{w/o}$ | 33.80 | 36.05 | 39.22 | 0.928 | 0.949 | 0.973 | 9325 |
| SelfDEQ | 34.05 | 36.79 | 39.64 | 0.929 | 0.950 | 0.973 | 9325 |

[1] GPU memory demand for training (MB).
SelfDEQ$^{w/o}$: SelfDEQ (unweighted).

FIG. 5B

| Sampling pattern | 1D Equispaced | | 2D Random | |
|---|---|---|---|---|
| Metrics | PSNR (dB) | SSIM | PSNR (dB) | SSIM |
| Zero-filled | 23.40 | 0.798 | 24.40 | 0.842 |
| SelfDU | 30.71 | 0.918 | 37.79 | 0.973 |
| SelfDEQ (unweighted) | 32.73 | 0.892 | 37.24 | 0.970 |
| SelfDEQ | 34.14 | 0.931 | 40.58 | 0.983 |
| Supervised | 34.68 | 0.955 | 40.82 | 0.983 |

FIG. 11

SELF-SUPERVISED DEEP LEARNING IMAGE RECONSTRUCTION WITH WEIGHTED TRAINING LOSS

CROSS-REFERENCE TO RELATED APPLICATIONS

This application claims priority to U.S. provisional application no. 63/378,746 filed on Oct. 7, 2022, the entire content of which is incorporated herein by reference in its entirety.

STATEMENT REGARDING FEDERALLY SPONSORED RESEARCH & DEVELOPMENT

This invention was made with government support under EB032713 awarded by the National Institutes of Health. The government has certain rights in the invention.

FIELD

The field of this disclosure relates generally to image reconstruction, and more particularly to self-supervised deep learning image reconstruction.

BACKGROUND

High-resolution magnetic resonance imaging ("MRI") acquisition with a large coverage takes a significant amount of time to acquire, which may reduce patient compliance and clinical workflow efficiency. Fast MRI is usually performed by sparsely sampling magnetic resonance ("MR") k-space below the Nyquist rate, which leads to image reconstruction artifacts and high noise. Hence, an imaging reconstruction method to provide high-quality images using under-sampled data is highly desired.

To overcome these challenges, compressed sensing ("CS") reconstruction has been employed to reconstruct undersampled MR data. A CS method typically utilizes an iterative algorithm by minimizing a cost function consisting of a data consistency term and prior-based regularization. However, CS becomes less effective when data is severely under-sampled. Furthermore, CS reconstruction is computationally time-consuming and usually necessitates empirical fine-tuning of regularization parameters. Deep learning ("DL") has been explored for MR image reconstruction. Iterative-based algorithms that alternate between data-consistency enforcement and pre-trained convolutional neural network ("CNN") denoisers are an alternative to the direct inversion approach. Model-based reconstruction with Deep Learned Priors ("MoDL") combines the strength of model-based reconstruction approaches with the power of deep learning. The network is made up of a combination of CNN blocks that capture information about the data set and data consistency ("DC") blocks that promote measurement consistency. The end-to-end training technique gives a significant boost in performance over using pre-trained denoisers since the network parameters are trained for the specific task of image recovery. These methods use an iterative reconstruction process to solve the objective method for a set number of iterations. The unrolled network alternates between DC and regularization, with the regularization being done implicitly via a neural network. These unrolled networks are then trained end to end with a loss function that measures similarity to a reference image and parameters may differ over unrolled iterations or may be shared among them.

Deep equilibrium models ("DEQ") have emerged as a powerful alternative to deep unfolding ("DU") for image reconstruction (e.g., in magnetic resonance imaging ("MRI")). DEQ models are implicit neural networks with effectively infinite number of layers and have been shown to achieve state-of-the-art image reconstruction without the memory complexity associated with DU. While the performance of DEQ has been widely investigated, the existing work has primarily focused on the settings where groundtruth data is available for training. What is needed is self-supervised MRI reconstruction methods for training model-based implicit neural networks for undersampled and noisy measurements.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF THE DISCLOSURE

One aspect of the present disclosure is a system for image reconstruction includes an input for receiving image data, a processor, and a memory. The memory stores instructions that cause the processor to reconstruct an image from the image data using a self-supervised deep learning model.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments described herein may be better understood by referring to the following description in conjunction with the accompanying drawings.

FIG. 3B summarizes PSNR/SSIM values of ablation methods on the testing dataset, thus quantitatively corroborating the visual results.

FIG. 5B summarizes the average PSNR and SSIM values of all the baseline methods on the testing dataset.

FIG. 11 is a table of SelfDEQ performance.

Corresponding reference characters indicate corresponding parts throughout the drawings.

DETAILED DESCRIPTION

Figure 1:
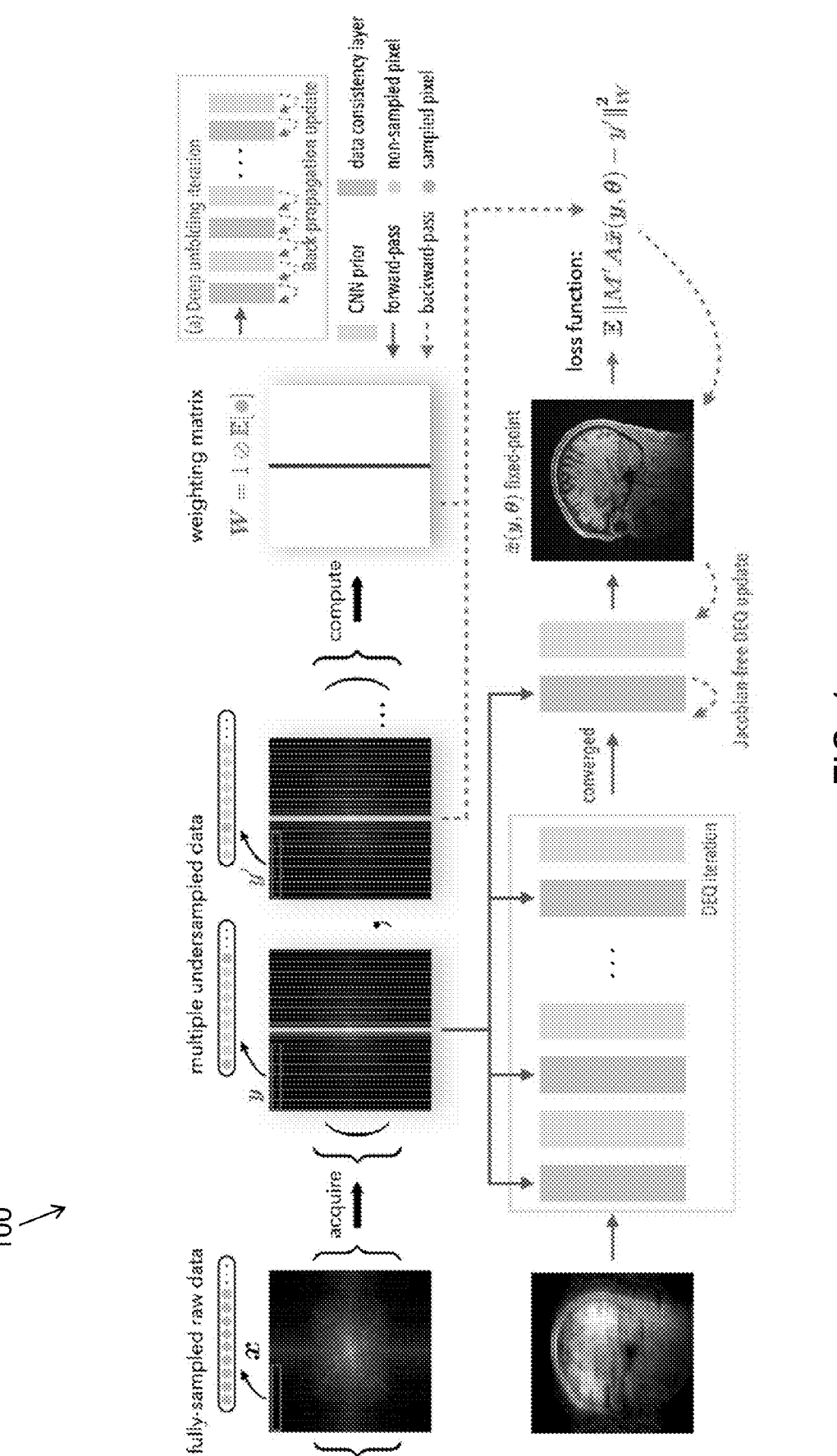
FIG. 1 is a diagram of an example method, or "SelfDEQ", for image reconstruction.

Inverse problems appear in medical imaging, bio-microscopy, and computational photography. Consider an inverse problem that seeks to recover an unknown image $x \in \mathbb{C}^n$ from its undersampled and noisy measurements $y \in \mathbb{C}^m$. For example, compressed sensing magnetic resonance imaging ("CS-MRI") is a well known inverse problem that aims to recover diagnostic quality images from undersampled and noisy k-space measurements. Deep learning ("DL") may be used with inverse problems to, for example, map acquired measurements to the desired images. Deep unfolding ("DU") may perform better than generic convolutional neural networks ("CNNs") by, for example, accounting for the physics of the imaging system. DU models may be obtained from optimization methods by interpreting a fixed number of operations as layers of a deep architecture and training it end to end. Despite the empirical success of DU in some applications, the high memory complexity of training DU models limits its use in large-scale imaging applications (e.g., 3D/4D MRI).

Natural ordinary differential equations ("ODEs") and deep equilibrium models ("DEQ") may be used as frameworks for training deep models with effectively infinite number of layers without the associated memory cost. Training a DEQ model for inverse problems can be analogous to training an infinite-depth DU model with constant memory complexity. However, DEQ is traditionally trained using supervised learning, which limits its applicability to problems with no groundtruth training data.

Systems and methods for self-supervised MRI reconstruction are described herein. In an example embodiment, the system performs a self-supervised deep learning model (referred to herein as "SelfDEQ") as a framework for training implicit neural networks (e.g., for MRI or other such applications) without groundtruth data. SelfDEQ is an image reconstruction framework for CS-MRI based on training a model-based implicit neural network directly on undersampled and noisy measurements, introducing novel implicit networks, specialized loss functions, and memory-efficient training methods. Results show that, for certain measurement operators, SelfDEQ using Jacobian-Free Backpropagation ("JFB") computes updates that match those obtained by fully-supervised DEQ. In the context of CS-MRI, the results imply that, under a set of explicitly specified assumptions, SelfDEQ can provably match the performance of DEQ trained using the groundtruth MRI images. Further, numerical results on experimentally-collected in-vivo brain MRI data shows that SelfDEQ can outperform recent DU-based self-supervised methods, match the performance of fully-supervised DEQ, and enable highly-accelerated data collection in parallel MM.

In an example embodiment, the system performs a self-supervised and physics-guided deep learning method by weighting k-space sampling density in network training loss (referred to herein as "weighted training loss or "WTL"). The goal of WTL is to regularize the forward Fourier model by using the weighted k-space deep learning prior with unrolling structure to shorten the MRI acquisition time by using a 16% Nyquist rate (1 minute) (an acceleration rate of 6.25). WTL is applied to MR data acquired using a golden angle stack-of-stars sequence to accelerate MR acquisition. Further, images have been reconstructed using the same unrolled network structure but without accounting for the k-space sampling density variations using a uniform weighted k-space in the training loss ("un-WTL") for comparison. Additionally, SSDU is adopted as a baseline method reference. Using the images reconstructed from a 5-minute scan as the gold standard, a structural similarity index measure ("SSIM") and peak signal-to-noise ratio (PSNR) is computed for reconstructed images from 1-min k-space data using SSDU, un-WTL, and WTL. 3D MR cranial bone imaging is generated using images reconstructed using the SSDU, un-WTL, and WTL methods.

In imaging inverse problems, measurements y are specified by a linear system:

$$y = MAx + e, \tag{1}$$

where x is the unknown image, $e \in \mathbb{C}^m$ is additive white Gaussian noise ("AWGN"), $A \in \mathbb{C}^{n \times n}$ is a measurement matrix, and $M \in \mathbb{R}^{m \times n}$ is a diagonal sampling matrix. Inverse problems are generally ill-posed. Traditional methods recover x by solving a regularized optimization:

$$\hat{x} = \operatorname*{argmin}_x f(x) \text{ with } f(x) = g(x) + h(x), \tag{2}$$

where g is the data-fidelity term that quantifies the discrepancy between the measurements and the solution, and where h is a regularizer that imposes prior knowledge on the unknown image. For example, in the context of imaging inverse problems are the least-squares and total variation ("TV"):

$$g(x) = \left(\frac{1}{2}\right)\|y - MAx\|_2^2 \text{ and } h(x) = \tau\|Dx\|_1, \quad (3)$$

where D is an image gradient and $\tau$ is the regularization parameter.

Deep learning ("DL") may include using a CNN to learn a mapping from the measurements to corresponding groundtruth images. Deep model-based architectures ("DM-BAs") may combine physical measurement models and learned image priors specified using CNNs, such as plug-and-play priors ("PnP"), Regularized by Denoiser ("RED"), and deep unfolding ("DU"). DU has gained notoriety due to its ability to achieve good performance while providing robustness to changes in data acquisition. DU architectures are typically obtained by unfolding iterations of an image reconstruction algorithm as layers, representing the regularizer within image reconstruction as a CNN, and training the resulting network end to end. DU architectures, however, are usually limited to a small number of unfolded iterations due to high memory complexity of training. Gradient checkpointing is a technique that may be useful for trading off memory complexity and computational cost for training DU models. By introducing K checkpoints for training a DU architecture, gradient checkpointing may reduce the memory complexity to 0(K) while generally increasing computational complexity. Gradient checkpointing aid in application of DU to large-scale imaging tasks, such as high-dimensional MRI reconstruction. The memory complexity of training of model-based architectures can be further reduced to 0(1) by using DEQ described below.

Deep equilibrium models ("DEQ") provide a framework for training recursive networks that have infinitely many layers without storing intermediate latent variables. Such methods may be implemented by running two consecutive steps in each training iteration, namely a forward pass and a backward pass. The forward pass computes a fixed point $\bar{x}$ of an operator $T_\theta$ parameterized by weights $\theta$:

$$\bar{x} = T_\theta(\bar{x}, y), \quad (4)$$

where y is the measurement vector. The fixed point $\bar{x}$ may be computed by running a fixed-point iteration with an acceleration algorithm. When $T_\theta$ denotes a step of DMBA, the DEQ forward pass is equivalent to DU with infinitely many unfolded layers. Given a loss function, the backward pass produces gradients with respect to $\theta$ by implicitly differentiating through the fixed points without the knowledge of how they are estimated. DEQ does not require storing the intermediate variables for computing the gradient, which reduces the memory complexity of training.

Some DL methods that reduce the dependance on groundtruth training data include Noise2Noise ("N2N"), deep image prior ("DIP"), and equivariant imaging. In particular, N2N may be used as a self-supervised DL framework for image restoration, which directly uses noisy observations $\{\hat{x}_{i,j} = x_i + e_{i,j}\}$ of groundtruth images $\{x_i\}$ for training. The N2N training can be formulated as:

$$\underset{\theta}{\text{argmin}} \sum_i \sum_{j \neq j'} \|f_\theta(\hat{x}_{i,j}) - \hat{x}_{i,j'}\|_2^2, \quad (5)$$

where $f_\theta$ denotes the DL model with trainable parameters $\theta$. The index j in (5) references different noisy observations of a given image i.

While DEQ has been shown to achieve increases in imaging performance, these conventional methods have focused on settings where groundtruth data is available for training. The present systems and methods address this gap by enabling DEQ training on noisy and undersampled sensor measurements. The SelfDEQ framework described herein may include several synergistic elements, such as, for example, (a) a model-based implicit network that integrates measurement operators and CNN priors; (b) a self-supervised loss that accounts for sampling imbalances; and (c) a Jacobian-free backward pass that leads to efficient training.

FIG. 1 is a diagram of an example method 100, or "SelfDEQ", for image reconstruction. In the example embodiment, the method 100, referred to interchangeably herein as "SelfDEQ", is illustrated for CS-MRI. Further, in the example embodiment, the method 100 may be performed by a computing device (not shown) such as a desktop or server computing device (e.g., having one or more CPUs, GPUs, memory, storage, display devices, input-output devices, networking hardware, and the like). Generally, for training, pairs of undersampled data of the same ground truth were used. As illustrated in the left-top corner, such pairs could be obtained by acquiring multiple measurements of the same ground truth. The forward pass of SelfDEQ computes a fixed-point of an operator consisting of data consistency layer and a CNN prior. The backward pass of SelfDEQ computes a descent direction using the Jacobian-free update that can be used to optimize the training parameters. SelfDEQ is trained using the proposed weighted loss that directly maps pairs of undersampled and noisy measurements of the same object to each other without fully-sampled ground truth. The symbol ⊘ denotes the Hadamard division (see also definition of W). (a) in the top-right corner presents an illustration of conventional deep unfolding for comparison In the example embodiment, a forward pass of SelfDEQ computes a fixed-point of an operator consisting of data consistency layer and a CNN prior. A backward pass of SelfDEQ computes a descent direction using the Jacobian-free update that can be used to optimize the training parameters. SelfDEQ is trained directly on pairs of undersampled and noisy measurements of the same object without fully-sampled groundtruth by using a weighted loss function.

Regarding weighted self-supervised loss, in the example embodiment, the method uses a training set of measurement pairs $\{y_i, y'_i\}_{i=1}^N$, with each pair $y_i, y'_i$ corresponding to the same object $x_i$:

$$y_i = M_i Ax_i + e_i \text{ and } y'_i = M'_i Ax_i + e'_i. \quad (6)$$

Here, $N \geq 1$ denotes the number of training pairs. Measurement pairs may be obtained by physically conducting two acquisitions or splitting each acquisition into two subsets.

Conventional algorithms based on N2N directly map the measurement pairs to each other during training. However, the measurements in the training dataset often have a significant overlap. For example, in CS-MRI, each acquisition shares the auto calibration signal ("ACS") region, which negatively influences the reconstruction performance.

In the example method 100, a diagonal weighted matrix W that accounts for the oversampled regions in the loss function is introduced:

$$\overline{W} = \text{diag}(\overline{w}_0, \overline{w}_1, \ldots, \overline{w}_n) \in \mathbb{R}^{n \times n}.$$

The diagonal entries of $\overline{W}$ are set as follows:

$$\overline{w}_k = \begin{cases} \dfrac{1}{\sqrt{\mathbb{E}[M'^T M']_{k,k}}} & \sqrt{\mathbb{E}[M'^T M']_{k,k}} \neq 0 \\ 0 & \sqrt{\mathbb{E}[M'^T M']_{k,k}} = 0 \end{cases}, \tag{7}$$

where, in practice, the expectation over random sampling patterns can be replaced with an empirical average over the training set. The following self-supervised training loss function is then defined as:

$$\ell_{self}(\theta) = \mathbb{E} \, \|M'A\overline{x}(\theta, y) - y'\|_W^2, \tag{8}$$

where $W = M'\overline{W}(M'\overline{W})^T \in \mathbb{R}^{m \times m}$ denotes a subsampled variant of $\overline{W}$ given M', and $\overline{x} = T_\theta(\overline{x}, y)$ denotes the fixed-point of $T_\theta$ for the input y and weights $\theta$.

Regarding forward and backward passes, the SelfDEQ forward pass of the method 100 is the fixed-point iterations:

$$x^k = T_\theta(x^{k-1}, y), \tag{9}$$

where:

$$T_\theta(x) = \alpha f_\theta(s) + (1-\alpha)s \tag{10}$$

with $s = x - \gamma \nabla g(x)$.

Figure 10:
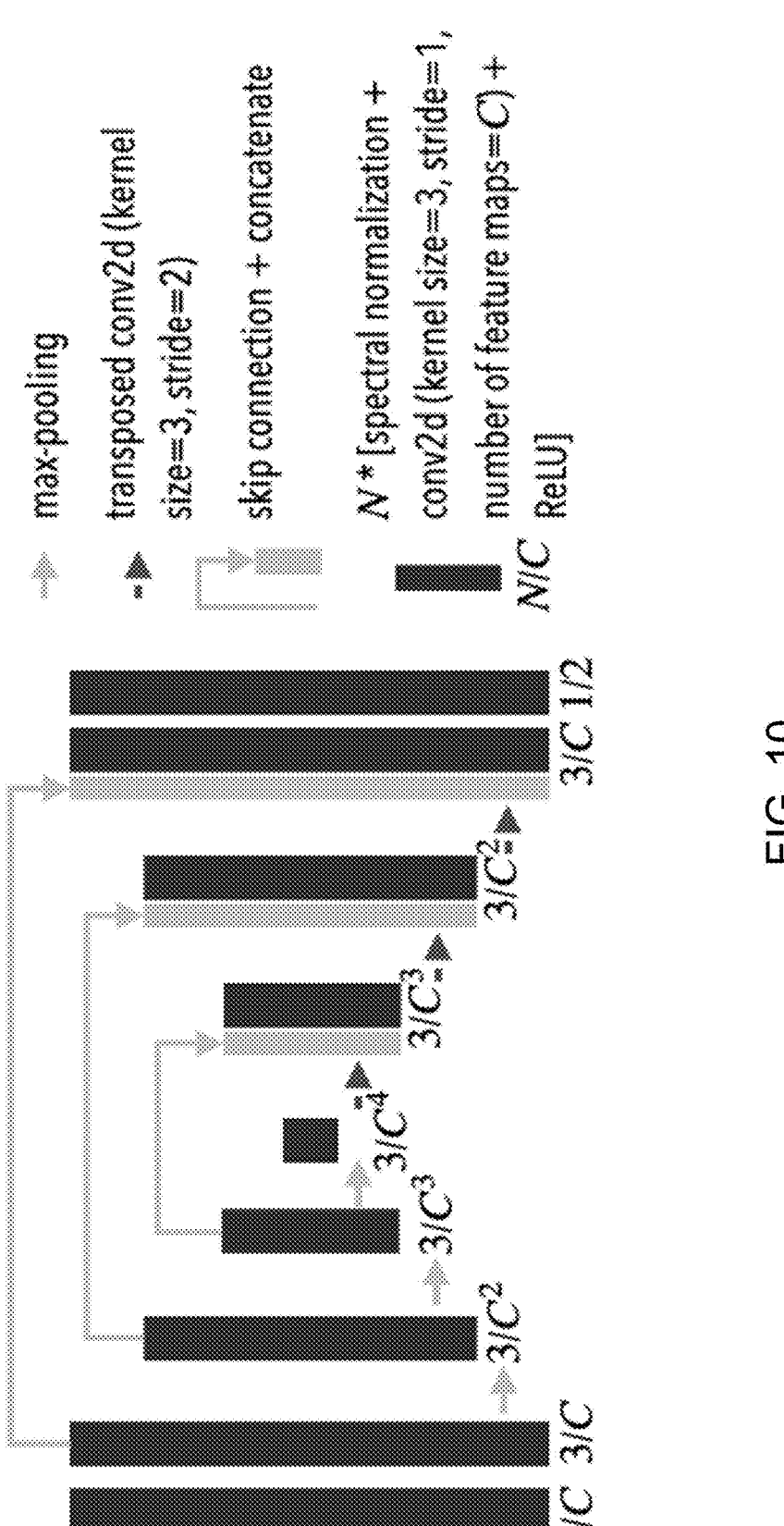
FIG. 10 is a CNN prior architecture for use in some embodiments.

The vector $x^k$ denotes the image at the kth layer of the implicit network, $\gamma$ and $\alpha$ are two hyper-parameters, and $f_\theta$ is the CNN prior with trainable parameters $\theta$. The implicit neural network is initialized using the pseudoinverse of the raw measurements $x^0 = A^\dagger y$, which corresponds to the zero-filled solution in CS-MRI. Given y, the forward-pass is run until convergence to a fixed-point $\overline{x} = T_\theta(\overline{x}, y)$. The U-Net is used for $f_\theta$. The architecture of $f_\theta$ is further illustrated in FIG. 10.

Given the self-supervised loss in eq. (8), the SelfDEQ backward pass uses a Jacobian-free backward pass ("JFB") to compute the DEQ update direction without computing the inverse-Jacobian. Specifically, the JFB update of $\ell_{self}$ in term of $\theta$ is given by:

$$JFB_{\ell_{self}}(\theta) = (\nabla_\theta T_\theta(\overline{x}))^H \left[\frac{\partial \ell_{self}}{\partial \overline{x}}\right]^T. \tag{11}$$

JFB provides valid descent directions for training implicit networks.

The SelfDEQ learning of method 100 is analyzed under two explicitly-specified assumptions. Under a first assumption, the training samples correspond to the setting in eq. (6) with $x \sim p_x$, $M \sim p_M$, $M' \sim p_M$, $e \sim \mathcal{N}(0, \sigma^2 I)$, and $e' \sim \mathcal{N}(0, \sigma^2 I)$ drawn i.i.d. from their respective distributions. This first assumption simply states that the sampling matrices, images, and noise are all sampled independently from each other.

Under a second assumption, $\mathbb{E}_M[M^T M]$ has a full rank and A is an orthogonal matrix, where the expectation is taken over $p_M$. This assumption implies that union of all the sampling matrices {M} covers the complete measurement domain. Note that each individual M can still be under-sampled.

Under these two assumptions, the JFB update of the weighted self-supervised loss of eq. (8) is equivalent to its supervised counterpart, namely that:

$$JF B_{\ell_{self}}(\theta) = JF B_{\ell_{sup}}(\theta), \tag{12}$$

where:

$$\ell_{sup}(\theta) = \mathbb{E}\left[\frac{1}{2}\|\overline{x}(\theta, y) - x\|_2^2\right]. \tag{13}$$

The theorem of eq.'s (12) and (13) states that the JFB updates obtained from the weighted self-supervised theoretically match those obtained using conventional supervised learning on DEQ. These updates can be easily integrated into any DL optimization algorithm, such as SGD and Adam.

Numerical results of SelfDEQ and method 100 are included in both simulated and in-vivo MRI data. The measurement matrix in parallel MRI can be expressed as $A_i = FS_i$, where F is the Fourier transform operator, and $S_i$ denotes the sensitivity profiles of the ith receiver coil. It is assumed that S is known and normalized to satisfy $\Sigma_i S_i^H S_i = I$. Since the Fourier transform operator is orthogonal, the matrix A in MRI naturally satisfies the second assumption. Note that, in order to estimate $S_i$ in practice, M has a fixed ACS in the low-frequency region of k-space. The random valuables in $p_M$ are the randomly sampled non-ACS indices of the k-space.

The forward-pass of SelfDEQ is ran with a maximum number of iterations of 100 and the stopping criterion of the relative norm difference between iterations being less than $10^{-3}$. Spectral normalization is added to all the layers of $f_\theta$ for stability. The best values of $\alpha$ and $\gamma$ are empirically determined to be $\alpha = 0.5$ and $\gamma = 1$. Adam is used as the optimizer with the learning rate $10^{-4}$. The mini-batch size is set to 8 and training epochs to 100 and 300 for real and simulated data, respectively. Experiments are performed on a machine equipped with an AMD Ryzen Threadripper 3960X processor and an NVIDIA GeForce RTX 3090 GPU. Two quantitative metrics were used, namely peak signal-to-noise ratio ("PSNR") measured in dB, and structural similarity index ("SSIM"), to evaluate the quality of reconstructed images.

Regarding ablation study on simulated data, multi-coil undersampled measurements are simulated from an open-access T2-weighted human brain MRI data. This MRI dataset has 360 and 160 slices of fully-sampled k-space measurements for training and testing, respectively. 60 slices are extracted from the training set for validation. The image domain matrix size for each slice is 256×232. The number of receiver coils is 12. The coil sensitivity maps for each slice are also provided, which are pre-computed using ESPIRiT algorithm. These fully-sampled data correspond to the groundtruth in the imaging system (e.g., $x_i$ in eq. (6)). A Cartesian sampling pattern is simulated that subsamples and fully samples along $k_y$ and $k_x$ dimensions, respectively. The simulated sampling mask in the k y dimension has fixed ACS lines and equispaced non-ACS lines. Let R be the acceleration factor. The size of ACS lines is set to 92/R. The experiments are conducted on three acceleration factors, R=4, 6, and 8, corresponding to 31%, 21%, and 16% sampling rates, respectively.

Figure 2:
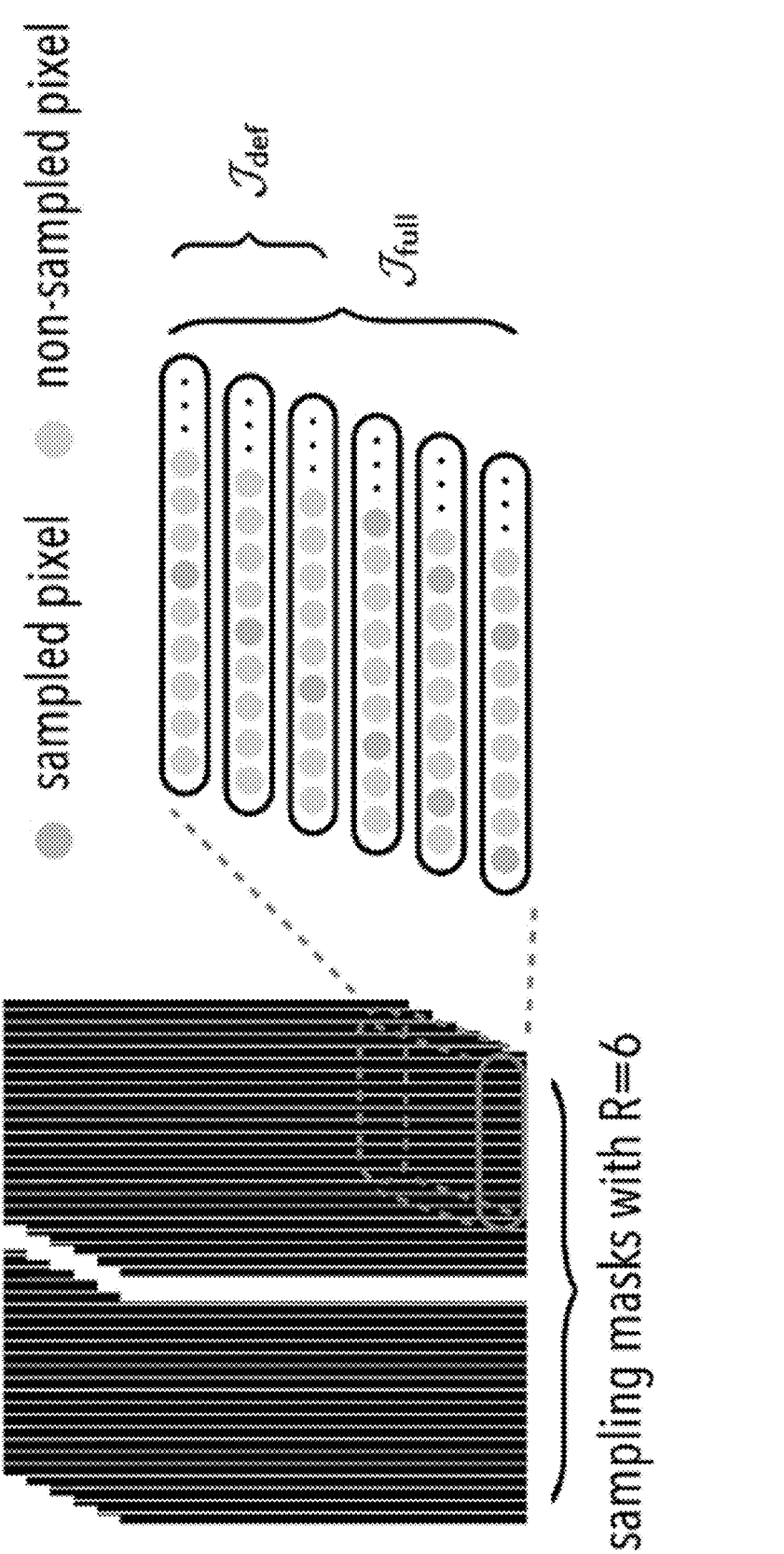
FIG. 2 is an illustration of sampling masks used for a numerical evaluation for an acceleration factor R=6.

FIG. 2 is an illustration of sampling masks used for a numerical evaluation for an acceleration factor R=6. As shown in FIG. 2, given an acceleration factor R, one can simulate R different sampling masks. Let J denote a subset of those simulated masks. When simulating the measurements, the sampling masks are sampled uniformly at random from J (e.g., $M_i$ and $M'_i$ in eq. (6)). The standard deviation of the AWGN (e.g., $e_i$ and $e'_i$ in eq. (6)) is set to 0.01.

Two different sampling settings are considered: full rank ($J_{full}$) and rank-deficient ($J_{def}$). In the full-rank setting, the sampling masks across training data cover all possible frequencies, while in the rank-deficient setting, the union of all sampling masks only covers half of the k-space. FIG. 2 visually illustrates both settings $J_{full}$ and $J_{def}$ for the acceleration factor R=6. Note that the sampling masks selected from $J_{full}$ naturally satisfies the second assumption, since $\mathbb{E}_{M \in J_{full}}[M^T M]$ full has full rank. On the other hand, $\mathbb{E}_{M \in J_{def}}[M^T M]$ does not satisfy the second assumption. Under these two sampling settings, the following experiments were ran using ablated variants of SelfDEQ: (a) Rank-deficient trains SelfDEQ on $J_{def}$; (b) Rank-deficient (unweighted) is similar to Rank-deficient, but uses the self-supervised loss without W; (c) Full-rank trains SelfDEQ on $J_{full}$; (d) Full-rank (unweighted) is similar to Full-rank, but uses the self-supervised loss without W; (e) Self-supervised is similar to Full-rank but uses the supervised loss in eq. (13), corresponding to the oracle DEQ performance. Note that, in FIG. 2, each individual sampling mask is always undersampled.

Figure 3A:
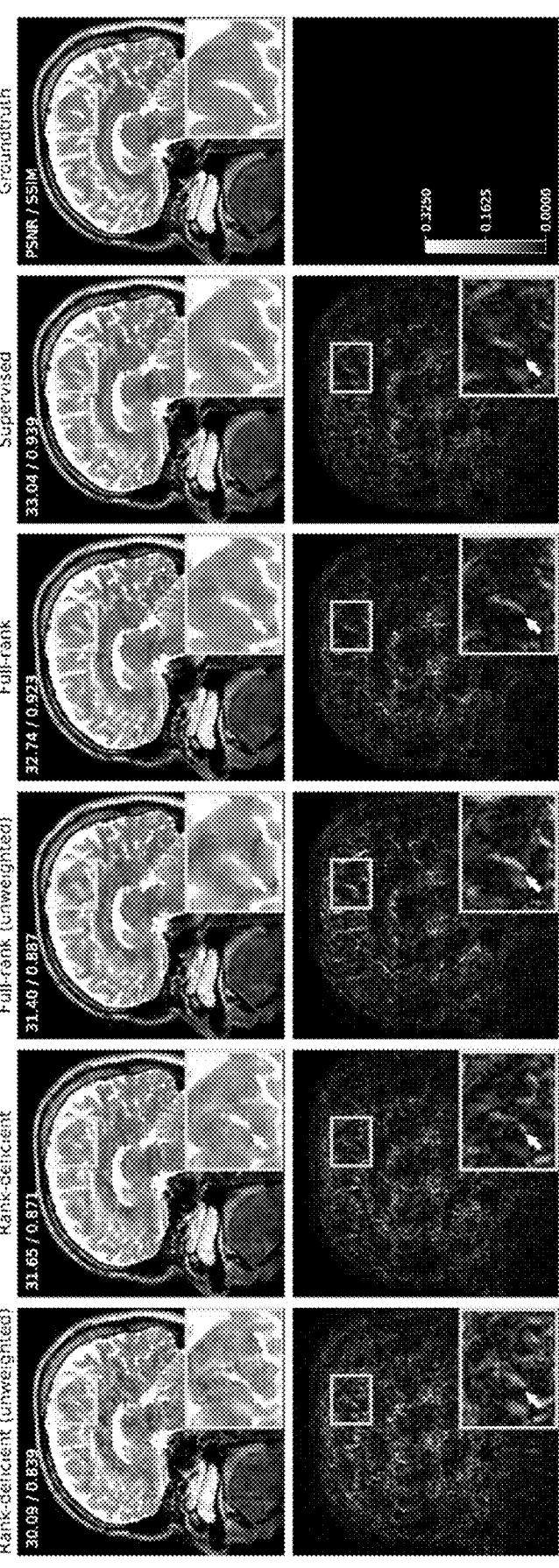
FIG. 3A illustrates the reconstruction results of all the ablated methods on R=6.
Figures 4A, 4B, 4C, 4D:
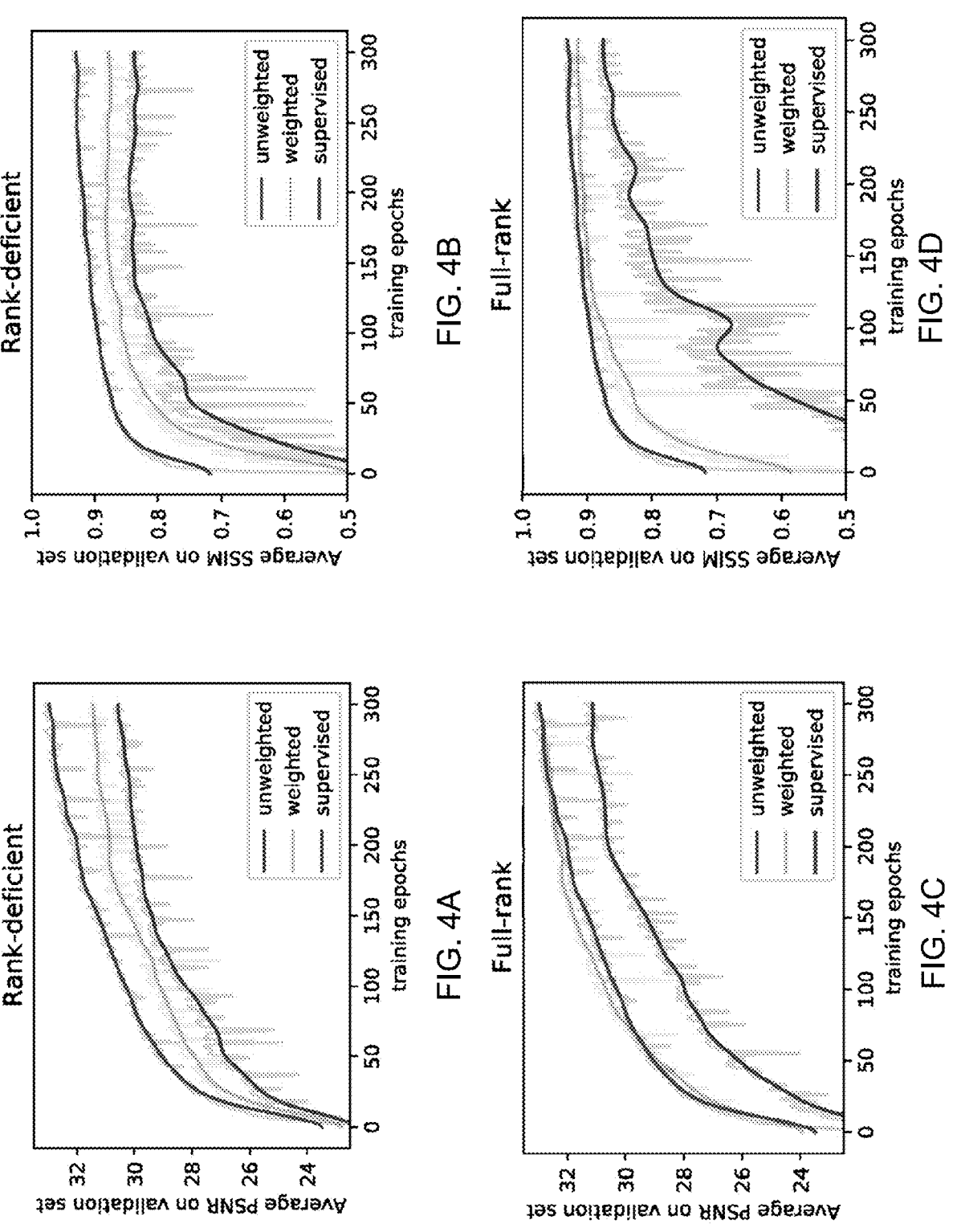
FIGS. 4A-4D plot PSNR and SSIM values against training epochs on the validation set with R=8.

FIG. 3A illustrates the reconstruction results of all the ablated methods on R=6. In FIG. 3A, visually significant differences are highlighted using white arrows. FIG. 3A shows that when the second assumption is satisfied and the proposed weighting scheme is used, the performance of self-supervised learning nearly matches that of fully-supervised learning. FIG. 3A also highlights that using weighted self-supervised loss improves the imaging quality even when the second assumption is not satisfied (e.g., the union of all the sampling masks does not cover the full k-space). For instance, note how the brain tissue highlighted using a white arrow is blurry for Full-rank (unweighted), while Full-rank can reconstruct it with fine details. Also note that while the settings $J_{full}$ provide better reconstruction performances compared to those of $J_{def}$ under the same losses, Rank-deficient outperforms Full-rank (unweighted), highlighting the effectiveness of the weighted matrix W for self-supervised learning. FIG. 3B summarizes PSNR/SSIM values of ablation methods on the testing dataset, thus quantitatively corroborating the visual results. More specifically, FIG. 3B includes average PSNR and SSIM values from an ablation study on simulated data. Full-rank satisfies assumptions used for the theoretical analysis and is trained using weighted self-supervised loss. The displayed data validates the theoretical analysis and highlights the importance of the weighting for the self-supervised loss function.

FIGS. 4A-4D plot PSNR and SSIM values against training epochs on the validation set with R=8. FIGS. 4A-4D show that Full-rank with weighted matrix has approximately the same PSNR/SSIM curve as the supervised baseline. FIGS. 4A-4D also shows that using a weighting matrix W in the self-supervised loss can significantly improve imaging quality, even in the setting $J_{def}$ where the second assumption does not hold.

Regarding experimentally collected in-vivo data, data acquisition is performed on a Siemens 3T Prisma scanner (Siemens Healthcare, Erlangen, Germany) with 64-channel Head/Neck coils. Images are collected using the Sagittal T1 magnetization-prepared rapid gradient-echo (MPRAGE) sequence. The acquisition parameters are: repetition time (TR)=2400 ms, echo time (TE)=2.62 ms, inversion time (TI)=1000 ms, flip angle (FA)=8 degrees, FOV=256×256 mm, voxel size=1×1×1 mm, slices per slab=176, slice and phase resolution=100% and slice and phase partial Fourier off. A 2× oversampling is used in the frequency encoding direction, and the asymmetric echo is turned on to allow short TE. The sampling pattern is equispaced 1D Cartesian with ACS lines. Brain MRI data is used from 14, 1, and 5 participants in this study for training validation, and testing, respectively (and with Institutional Review Board approval). Training data is acquired with GRAPPA=2 in phase encoding (PE) direction with 24 ACS lines, the total acquisition time is 5 minutes and 35 seconds, and the raw measurements correspond to approximately 65% sampling rate. The validation and testing data are fully-sampled measurements acquired with GRAPPA turned off, and the total acquisition time was 10 minutes and 16 seconds. Groundtruth is considered as the root-sum-square (RSS) reconstruction from the fully-sampled data.

Experiments used the acceleration factors of R=4, R=6, and R=8, corresponding to the retrospectively sampling rate of 30%, 20%, and 16%, respectively. Two training measurements of the same subjects are obtained (e.g., $y'_i$ and $y_i$ of eq. (6)) by allocating acquired Cartesian lines into two bins. Note that no groundtruth data was used during training. A 1D Fourier transform is applied on the $k_z$ dimension of the raw data and then reconstructed the images slice by slice. The raw measurement of each slice is of size 256×512×64 with 256×512 being $k_x \times k_y$ dimension and 64 being the numbers of receiver coils. Note that the high number of receiver coils makes DU methods impractical due to the increase in the computation and memory complexity.

SelfDEQ is compared against several standard baseline methods and state-of-the-art self-supervised MRI methods. (a) Total Variation (TV): an optimization-based method using total variation regularizer in (3), with optimizing the trade-off parameter τ using grid search. (b) Artifact2Artifact (A2A): trains U-Net by mapping corrupted MR images of the same subject to each other. (c) SSDU: a self-supervised method that trains a DU network by dividing each k-space MRI acquisition into two subsets and mapping them to each other. (d) SelfDU: a DU network trained on the same DL architecture and using the weighted loss function of SelfDEQ. DU iterations of SSDU and SelfDU are set to 7, which is the maximum number achievable under memory constraints of the test machine. SelfDEQ (unweighted) was also implemented as an ablated method that trains SelfDEQ on the self-supervised loss without W.

Figure 5A:
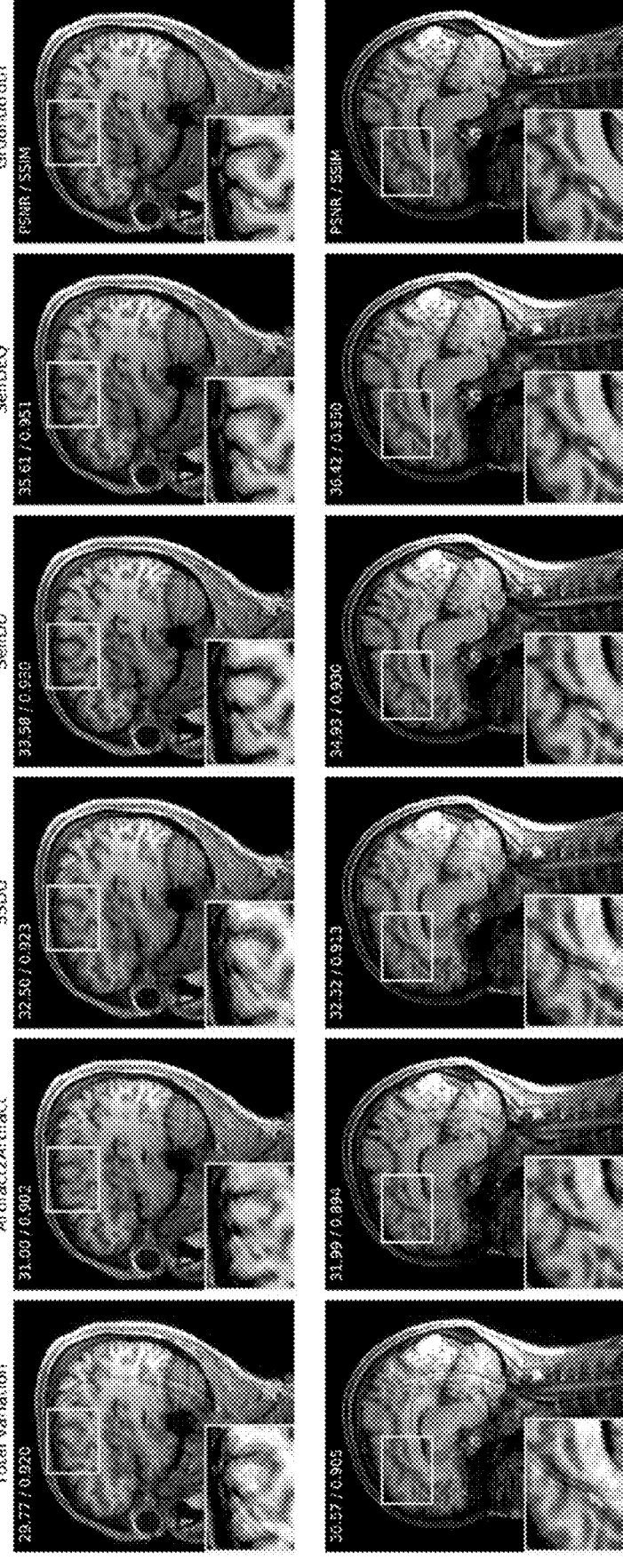
FIG. 5A illustrates the reconstruction results of all baseline methods on R=6.

FIG. 5A illustrates the reconstruction results of all baseline methods on R=6. Total variation suffers from detail loss due to the well-known "staircase effect." While Artifact2Artifact has better performance than Total variation by learning the prior from data, SSDU and SelfDU outperformed it due to their model-based DU architectures. Overall, SelfDEQ achieves the best performance in artifact removal and sharpness. For instance, the reconstructed images obtained using SelfDEQ are sharper and have more fine details, especially in the brain tissues highlighted by green arrows. On the other hand, other methods show ghosting artifacts in their reconstructed images (e.g., see also zoomed-in regions in FIG. 5A). FIG. 5B summarizes the average PSNR and SSIM values of all the baseline methods on the testing dataset. The quantitative evaluations in FIG. 5B show the superior performance achieved by SelfDEQ. Further, FIG. 5B also provides the GPU memory requirements of each method for training, highlighting that SelfDEQ can achieve better results with lower GPU memory demand than the DU-based methods. SelfDEQ training time was approximately forty hours, approximately two hours more than SelfDU even though the forward pass of SelfDEQ can run up to 100 iterations, which is considerably larger than that of SelfDU. Two primary reasons for this are: a) the stopping criterion on the SelfDEQ forward pass based on the relative norm difference between the iterates, thus potentially resulting in fewer than 100 forward iterations in some training samples; b) unlike the DUmethods, SelfDEQ does not need backpropagation due to the JFB updates.

Figure 6:
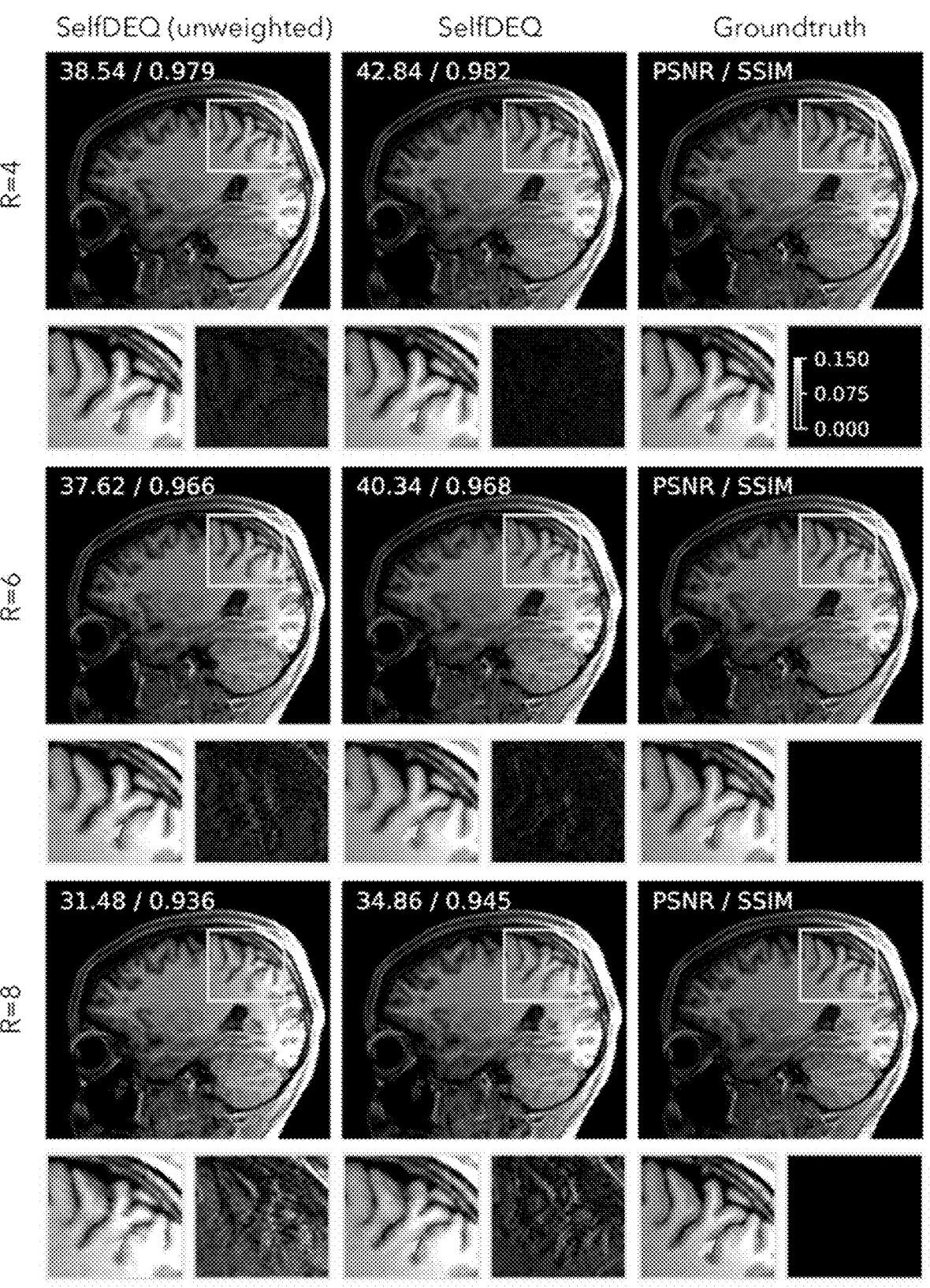
FIG. 6 illustrates reconstruction results of SelfDEQ and SelfDEQ (unweighted) on different acceleration factors and on the same image slice.

FIG. 6 illustrates reconstruction results of SelfDEQ and SelfDEQ (unweighted) on different acceleration factors and on the same image slice. FIG. 6 also shows that using the weighted matrix W in the self-supervised loss function can improve the imaging quality at different sampling rates.

Practically obtaining training data for SelfDEQ is straightforward. According to the second assumption, it is sufficient to have a set of forward operators, where each operator subsamples the measurement domain, but their union over the training data covers the full space. For example, in MRI, one can implement the set of sampling masks as illustrated in FIG. 2 then randomly apply one sampling mask from the set during scanning. In this example, individual undersampled measurements are still compatible with widely-used imaging techniques, such as GRAPPA or ESPIRiT.

Figure 12:
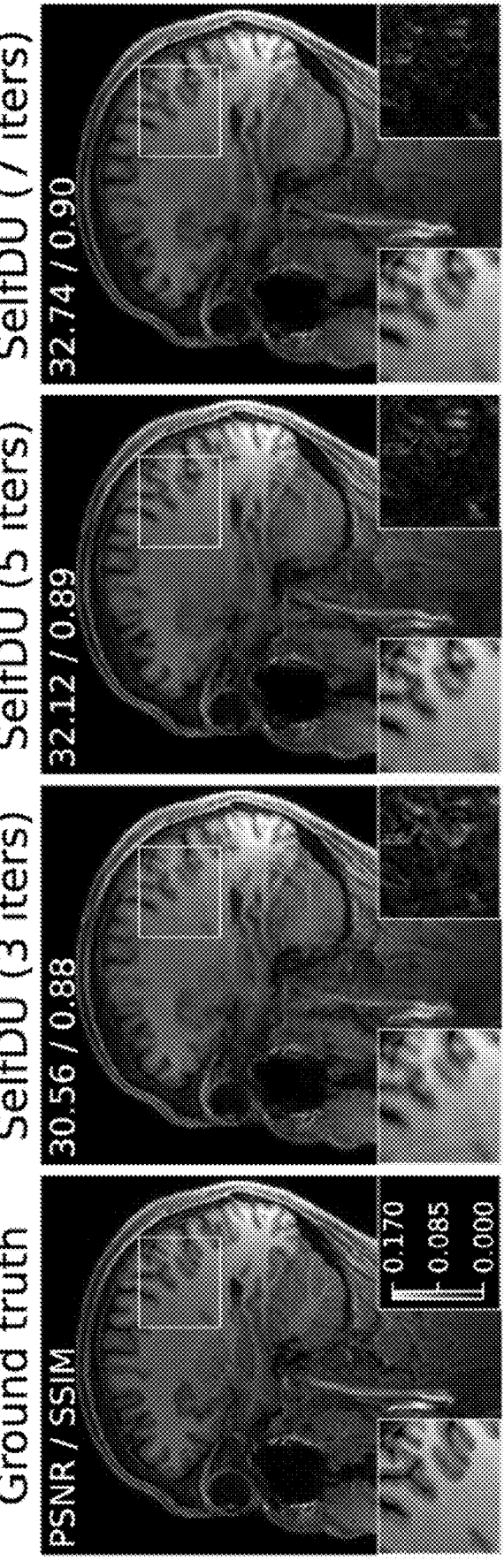
FIG. 12 is a series of images reconstructed with different numbers of DU iterations.
Figures 13A, 13B:
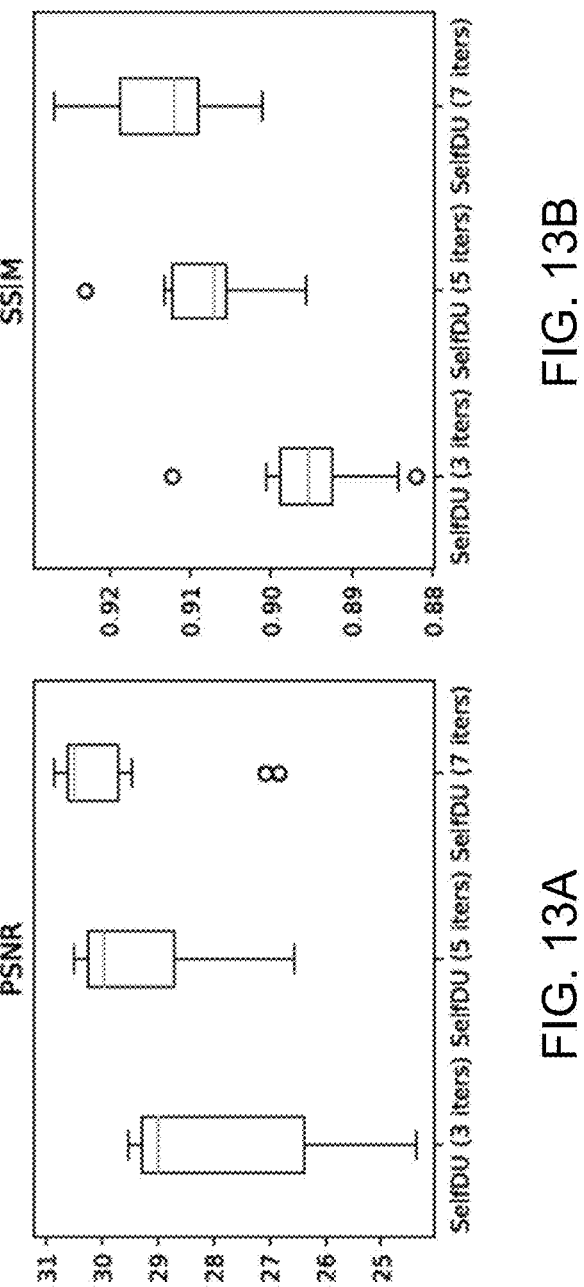
FIG. 13A illustrates the PSNR with different numbers of DU iterations, summarizing all subjects in a box plot.
FIG. 13B illustrates the SSIM with different numbers of DU iterations, summarizing all subjects in a box plot.

In another example, fully random 2D sampling patterns with an acceleration factor of R=6 provided on the same discussed above (e.g., with respect to FIGS. 3A-5B) were used. Aside from the sampling pattern, the same setup was used. SelfDU, SelfDEQ (unweighted), and SelfDEQ were used on the new 2D random sampling patterns. The DU iterations for SelfDU were set to 20, which was the maximum number achievable within the memory constraints of the machine being used. The table in FIG. 11 summarizes the average PSNR and SSIM values on the testing dataset. In FIG. 11, supervised refers to the supervised learning counterpart of SelfDEQ. The 1D Equispaced sampling pattern corresponds to the Full-rank sampling setting under acceleration factor R=6 in the examples above. FIG. 11 shows that SelfDEQ, when tested on a 2D random sampling pattern, maintains superior performance over both SelfDU and SelfDEQ (unweighted). FIG. 11 also shows that SelfDEQ can achieve better performance on a 2D random sampling pattern than on a 1D Equispaced sampling pattern, given the same acceleration factor. SelfDU was also used on in-vivo data under acceleration factor R=8 with smaller iterations of 3 and 5, denoted as SelfDU (3 iters) and SelfDU (5 iters). FIG. 12 presents visual results of SelfDU with different DU iterations, while FIG. 13 provides the corresponding quantitative evaluation over the testing dataset. FIGS. 12 and 13 demonstrate that increasing the DU iterations for SelfDU has the potential to improve performance and thus shrink the gap between SelfDU and SelfDEQ.

One benefit of SelfDEQ is its memory efficiency, which is well suited for large-scale imaging problems with high dimensional data. In experiments on real MRI data, SelfDEQ may be applied on parallel MRI where the dimension of the receiver coils are impractically high for conventional DU methods. SelfDEQ may be applied on other high-dimensional data such as, for example, 4D free-breathing MM or 2D+time cardiac MRI, where it is also challenging to obtain high-quality groundtruth.

SelfDEQ thus provides a novel self-supervised learning framework for training model-based deep implicit neural networks for image reconstruction in accelerated MRI. SelfDEQ enables efficient and effective training of implicit networks directly on undersampled and noisy MM measurements without any groundtruth. The SelfDEQ framework includes several synergistic elements, including: (a) a model-based implicit network that integrates measurement operators and CNN priors; (b) a self-supervised loss that accounts for sampling imbalances; and (c) a Jacobian-free backward pass that leads to efficient training. SelfDEQ has been shown to perform as well as supervised learning.

Further, the SelfDEQ framework has been tested on real MRI data, showing that it (i) outperforms recent DU based self-supervised methods; (ii) matches the performance of fully-supervised DEQ; and (iii) enables highly-accelerated data collection in parallel MRI.

Figure 7:
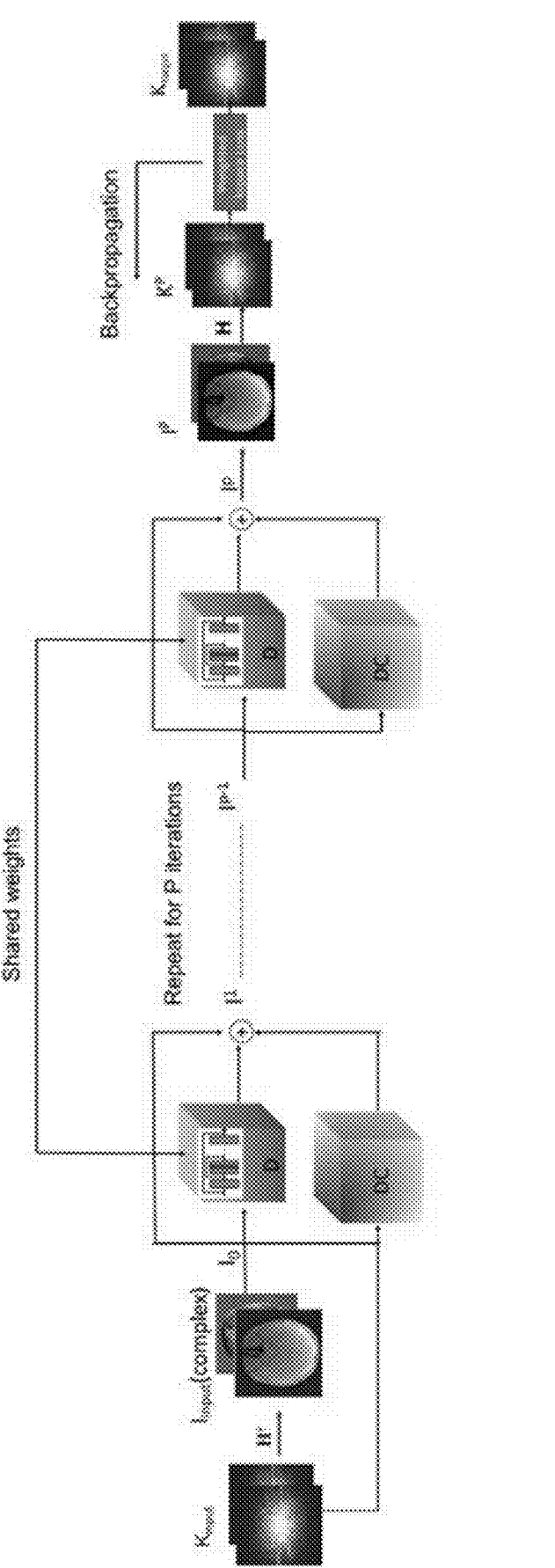
FIG. 7 is an example method for performing a self-supervised and physics-guided deep learning method by weighting k-space sampling density in network training loss (referred to herein as "WTL").

FIG. 7 is an example method 700 for performing a self-supervised and physics-guided deep learning method by weighting k-space sampling density in network training loss (referred to herein as "weighted training loss" or "WTL"). The method 700 may be referred to interchangeably herein as "WTL." Regarding image acquisition, in the example embodiment, a 3T (Prisma or VIDA) MR scanner is used to scan 32 participants. A Fast Low-Angle Shot (FLASH) Golden-Angle 3D stack-of-stars radial Volumetric Interpolated Breath-hold Examination sequence (GA-VIBE) is utilized to obtain MR images because of its motion resilience. Further, the following characteristics were used: TR/TE=4.84 ms/2.47 ms, field of view 192 mm, Bandwidth=410 Hz/pixel, 224 slices per slab, transverse orientation, Flip angle=3°, acquisition matrix=320×320, voxel size 0.6×0.6×0.8 mm$^3$ and total number of radial lines=400 for a scan duration of 5 minutes and 4 seconds.

In the example embodiment, WTL is employed to reconstruct under-sampled MR k-space data. This method reconstructs images by iteratively minimizing a loss function:

$$I=\operatorname{argmin}_I \Sigma_i \Sigma_j \|H_{i,j} \cdot I - K_{i,j}\|_2^2 + h(I), \qquad (14)$$

$$h(I)=\lambda_m/2\|I^T(I-R_\theta(I)\|_1, \qquad (15)$$

where the operator $H_{i,j}$=F·$C_j$, F is the forward Fourier (NUFFT) operator, $C_j$ is the coil sensitivity for coil j, I is the to-be-determined image, and $K_{i,j}$ is the acquired k-space data for spoke i within coil j. The first term of the cost function is to ensure data consistency (DC), while the second term h(I) in eq. 15 is a regularization term using a convolutional neural network $R_\theta$(I). $I^T$ is the transpose of I and $\lambda_m$ is the regularization coefficient that balances the tradeoff between data consistency and regularization.

FIG. 7 illustrates the unrolled network architecture of WTL, which consists of the DC and $D_\theta$(I)=I–$R_\theta$(I) blocks in FIG. 7. During training, the k-space data of a 400 radial spokes (5 min scan) can be divided into two disjoint data sets: the first 80 radial spokes (1 min) as $K_{input}$ and the remaining 320 spokes (4 minutes) as $K_{target}$. The full Nyquist sampling rate for the radial scan needs 502 spokes. 80 and 320 spokes correspond to 16% and 64% of the Nyquist sampling rate, respectively. $K_{input}$ is transformed into the spatial domain ($I_{input}$) via an inverse Fourier transform $H^\dagger$. The complex $K_{input}$ and $I_{input}$ are then fed into the unrolled network for P iterations. $I^P$ is the output of the unrolled network. A Forward Fourier transform H is applied to $I^P$ to transform it to k-space and sampled it at the same k-space locations as $K_{target}$.

Regarding weighting k-space sampling density in the training loss function, a L1-loss is constructed as the difference between H $I^P$ and $K_{target}$ and then weighted by k-space sampling density as depicted in eq. (16):

$$\operatorname{argmin}\Sigma\|H_j I^P - K_{target}\|_W, \qquad (16)$$

where W is the weighting to account for k-space sampling density variations. $H_j$=S F $C_j$ where F is the forward Fourier (NUFFT) operator, $C_j$ is the coil sensitivity for Coil j, and S is the sampling function. S″ is a normalized metrice of S which is $S_i''$=$S_i/\Sigma_n S_i$, and then the matrice W is defined with each elements of $W_i$=1/$S_i''$ at each sampling location I, N is the total number of radial sampling. Small weights are applied in the lower k-space and large weights are applied in the outer k-space. This weighted L1-loss is minimized through training.

Regarding network and training details, the data consistency in the unrolled network is implemented with the conjugate gradient method for solving eq. (15), which itself was unrolled for 5 iterations (P=5 in FIG. 7). The neural network of eq. (15) is implemented using a CNN based on a ResUNet structure similar to U-RED. The learned operator blocks within U-RED ($R_\theta$) share their weights across all iterations. They are trained in an end-to-end manner by accounting for the data consistency layers. This CNN consists of a layer of input and output convolution layers, and 7 residual blocks with skip connections that facilitate information flow during network training. Each residual block consisted of convolutional layers, followed by a rectified linear (RELU) unit. All layers have a kernel size of 3×3 and 64 channels. This ResUNet CNN has a total of 1,166,820 trainable parameters, which are shared across the unrolled iterations. In total, there are a total of 32 subjects, each time 10 subjects were randomly selected for training, and 4 subjects are used for validation and the remaining are used for testing. PyTorch 1.8.2 is used to implement the deep ResUNet unrolled framework using a computer with an Intel Xeon Gold 6216 processor and an NVIDIA Tesla A100 graphics processing unit. The training and validation procedure took approximately two days (GPU). Using a single GPU, testing took less than a minute.

Regarding baseline methods, the WTL is compared to two other DL-based reconstruction methods. To evaluate the effect of k-space sampling density weighted, the same unrolling network is used but without accounting for k-space sampling density in network training loss. in other words, a uniform weighted is used in the training loss (un-WTL). W is equal to the identity matrix (I) in eq. (16). The SSDU method is adopted and implemented as another baseline method. SSDU is a self-supervised method using a deep unrolling network. Similar to the SSDU method, here, the k-space MRI data is divided into two disjoint subsets and uses one set with 32 spokes for data consistency layer and the other set with 48 spokes in the regularization layer.

Regarding cranial bone 3D reconstruction, the bias-field corrected MR images are inverted and masked with the head binary mask, resulting in high and low signal intensities for skull bone and soft tissue, respectively. Using the 3D Slicer software, a global intensity threshold is manually determined after the intensity inversion to create a 3D skull bone rendering.

Regarding performance evaluations, the 5-minute data (400 spokes) reconstructed using multi-coil non-uniform fast Fourier transformation (MCNUFFT) is used as the gold standard. The first 1-minute of MR data from each subject is reconstructed using the WTL, un-WTL, and SSDU methods. Using the 5-min MCNUFFT scan as the gold standard, the structural similarity index measure (SSIM) and peak signal to noise ratio (PSNR) is calculated for the 1-min WTL, 1-min un-WTL, and the 1-min SSDU reconstructed images.

One-way ANOVA followed by Dunnett's multiple comparisons test is performed to compare the SSIM and PSNR for the 1-min SSDU, 1-min un-WTL, using GraphPad Prism (version 9.0.0, GraphPad Software, San Diego, California USA).

Figure 8A:
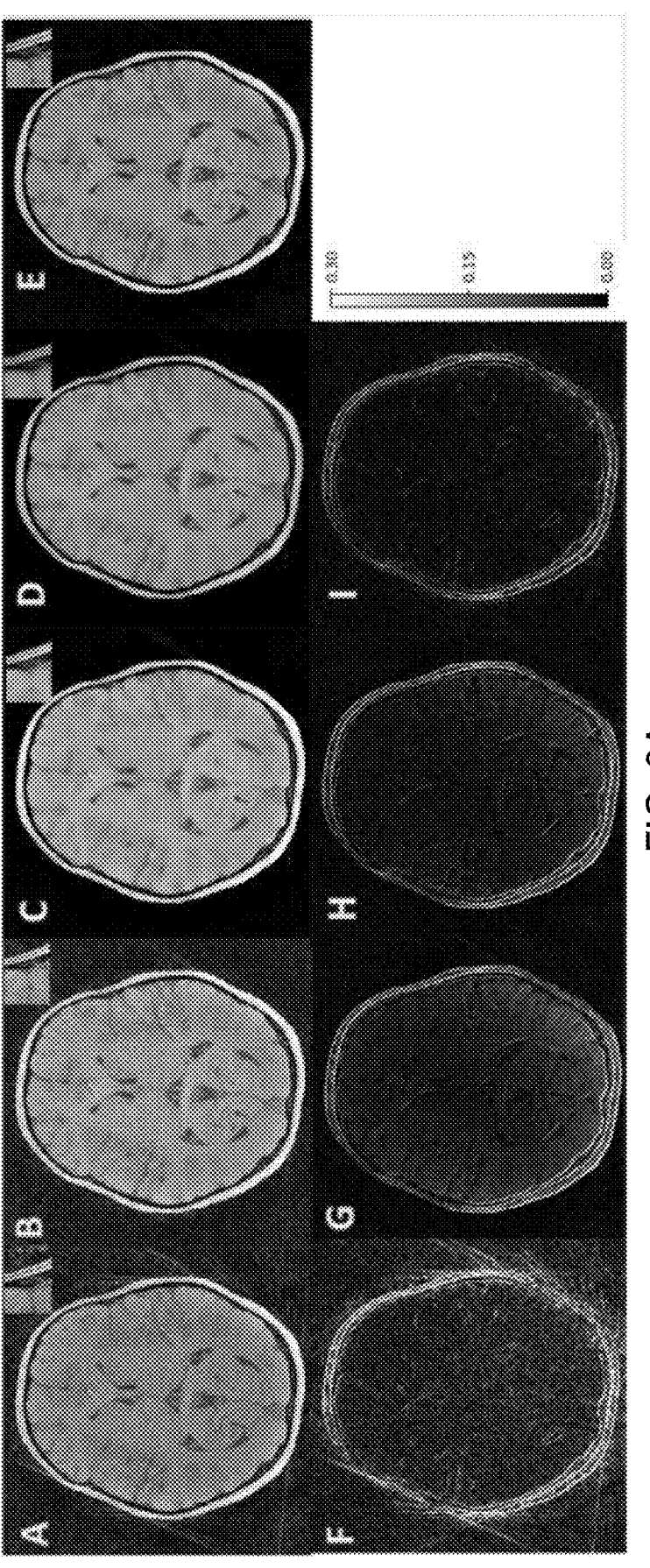
FIG. 8A illustrates various resulting MR images.

FIG. 8A illustrates various resulting MR images. In the example embodiment, MRNUFFT, SSDU, un-WTL, and WTL are used to reconstruct 1-minute k-space data. The 5-min MCNUFFT images (FIG. 8A, slide "E") are considered as the gold standard reference. 1-min MCNUFFT has high noise and reconstruction artifacts (FIG. 8A, slide "A"), 1-min SSDU (FIG. 8A, slide "B") reduced noise and artifacts compared to 1-min MCNUFFT, but there are still visible artifacts compared to 5-min MCNUFFT marked by the red arrow. 1-min un-WTL has further reduced noise and artifacts but at the expense of image sharpness, resulting in less visibility of small structures (FIG. 8A, slide "C"). The proposed WTL is effective in reducing artifacts and noise, while still preserving fine details of the structures (FIG. 8A, slide "D"). Difference images compared to the reference image are shown in the second row of FIG. 8A, as slides "F", "G", "H", and "I".

Figure 8B:
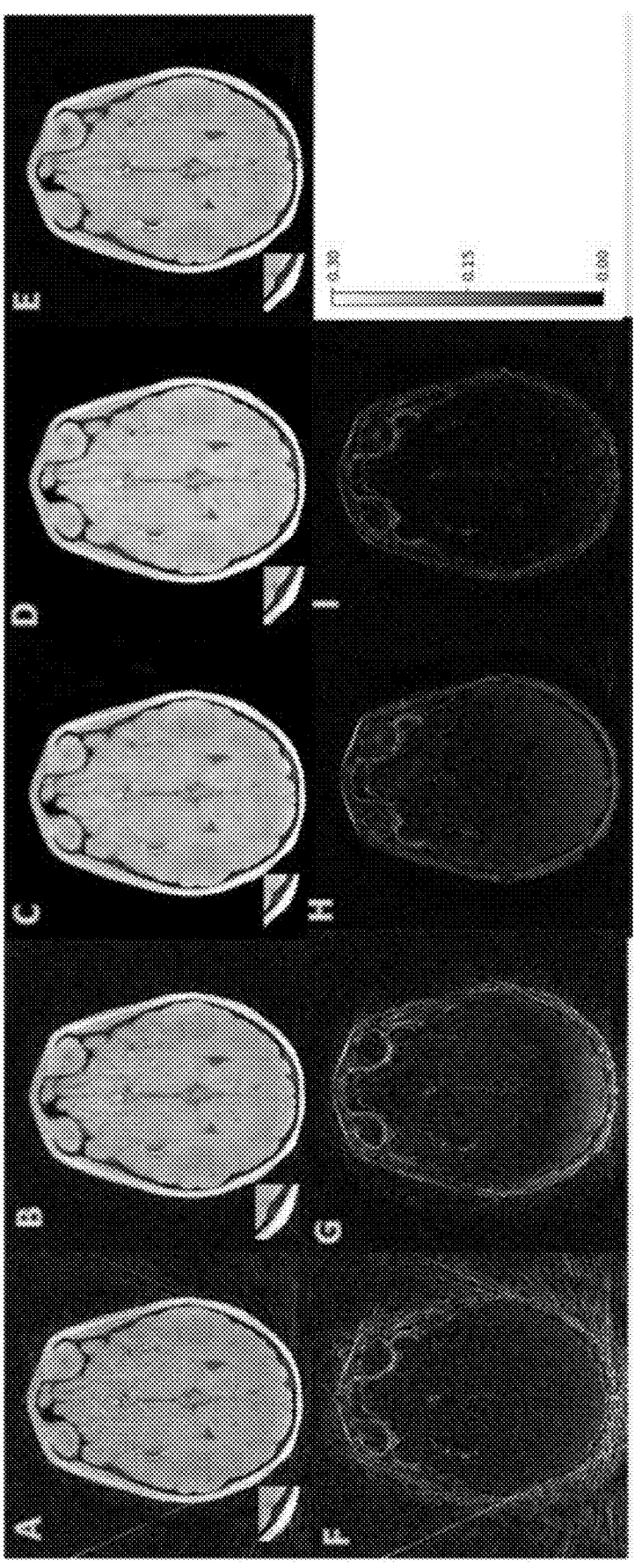
FIG. 8B and FIG. 8C similarly illustrate representative 1-min MCNUFFT (slides "A"), 1-min SSDU (slides "B"), 1-min un-WTL (slides "C"), 1-min WTL (slides "D"), and 5-min MCNUFFT (slides "E"), and their difference images (second row) from two other participants.
Figure 8C:
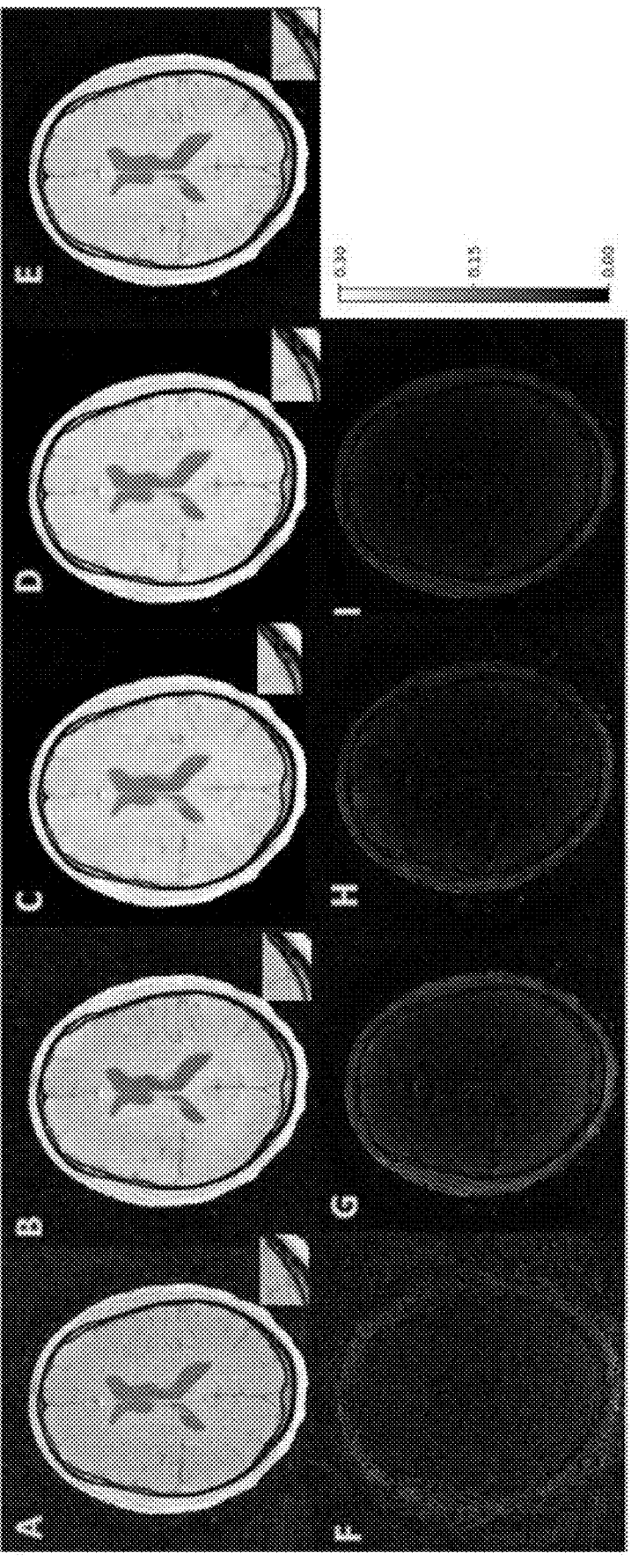

FIG. 8B and FIG. 8C similarly illustrate representative 1-min MCNUFFT (slides "A"), 1-min SSDU (slides "B"), 1-min un-WTL (slides "C"), 1-min WTL (slides "D"), and 5-min MCNUFFT (slides "E"), and their difference images (second row) from two other participants. 1-min WTL closely resembles the 5-min MCNUFFT images, and the difference between these two was small. The SSDU approach suffers from visible residual artifacts, with the un-WTL and WTL having fewer artifacts. The un-WTL blurred suture regions (marked in the zoomed-in region in the red rectangle). The WTL image has improved suture visibility compared to un-WTL. The WTL successfully performs reconstruction with an acceleration rate of 6.25×at 16% Nyquist sampling rate.

Figure 8D:
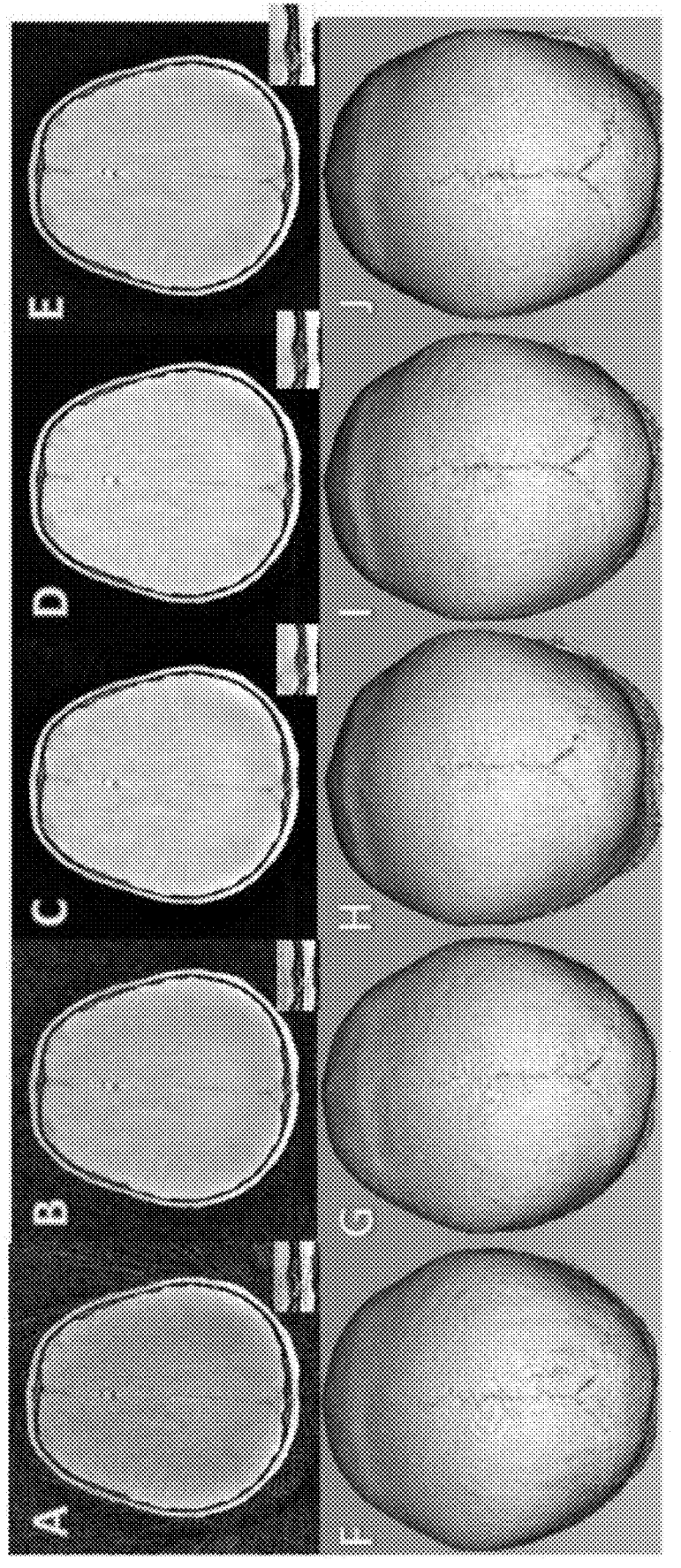
FIG. 8D illustrates volumetric and 3D rendered cranial images from a 4.2-year-old patient with lambdoid and sagittal sutures.
Figure 8E:
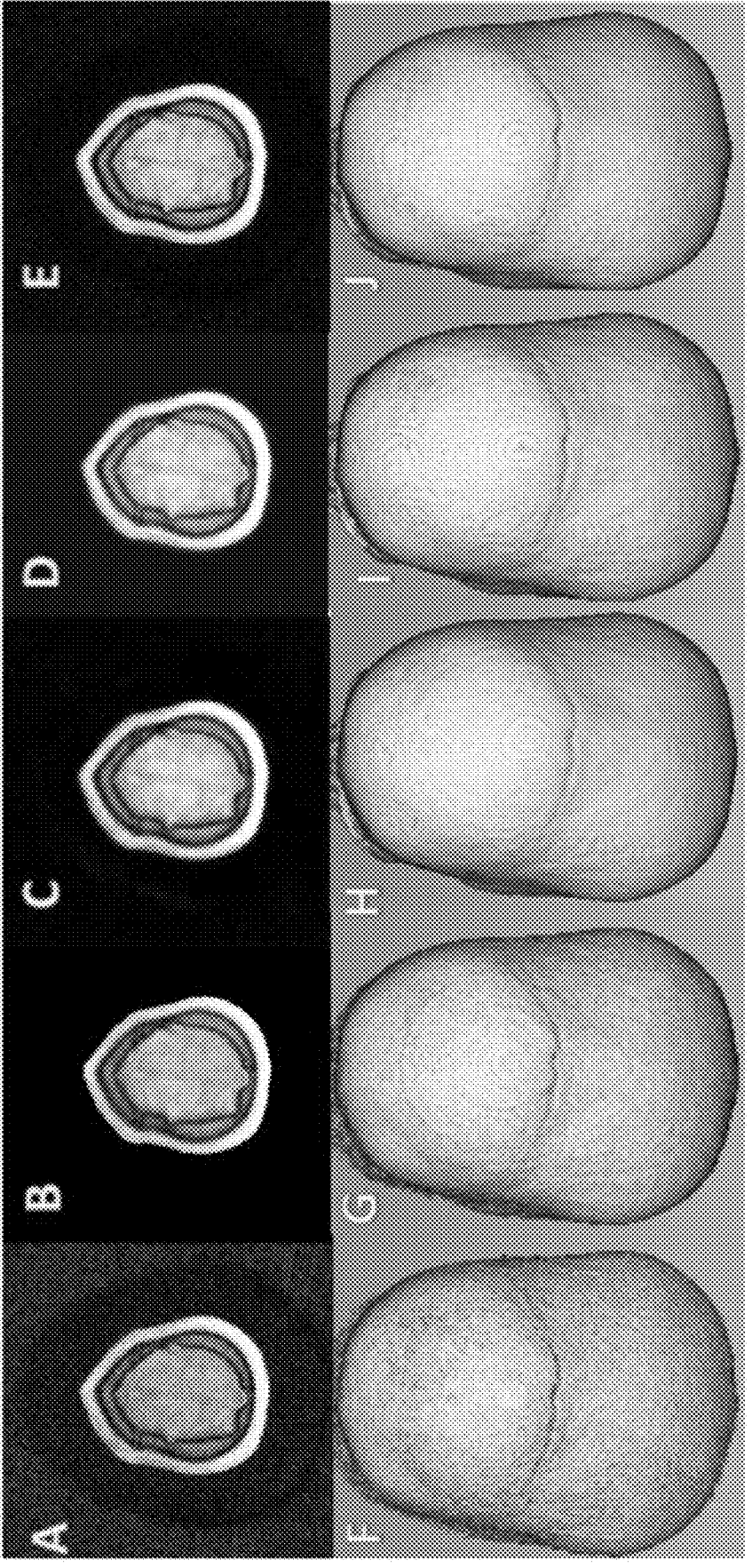
FIG. 8E illustrates volumetric and 3D rendered cranial images from a 1.8-year-old craniosynostosis participant with an open coronal suture but a closed sagittal suture.

FIG. 8D illustrates volumetric and 3D rendered cranial images from a 4.2-year-old patient with lambdoid and sagittal sutures. FIG. 8E illustrates volumetric and 3D rendered cranial images from a 1.8-year-old craniosynostosis participant with an open coronal suture but a closed sagittal suture. Slides "A" and "F" are 1-min MCNUFFT, slides "B" and "G" are 1-min SSDU, slides "C" and "H" are 1-min un-WTL, slides "D" and "I" are 1-min WTL, and slides "E" and "J" are 5-min MCNUFFT. These 3D rendered images were created from inverted MR images using 3D Slicer. High resolution 1-min MR inverted images generated by the WTL method produced similar suture visibility for the coronal and sagittal sutures compared to the 5-min MCNUFFT.

Figure 8F:
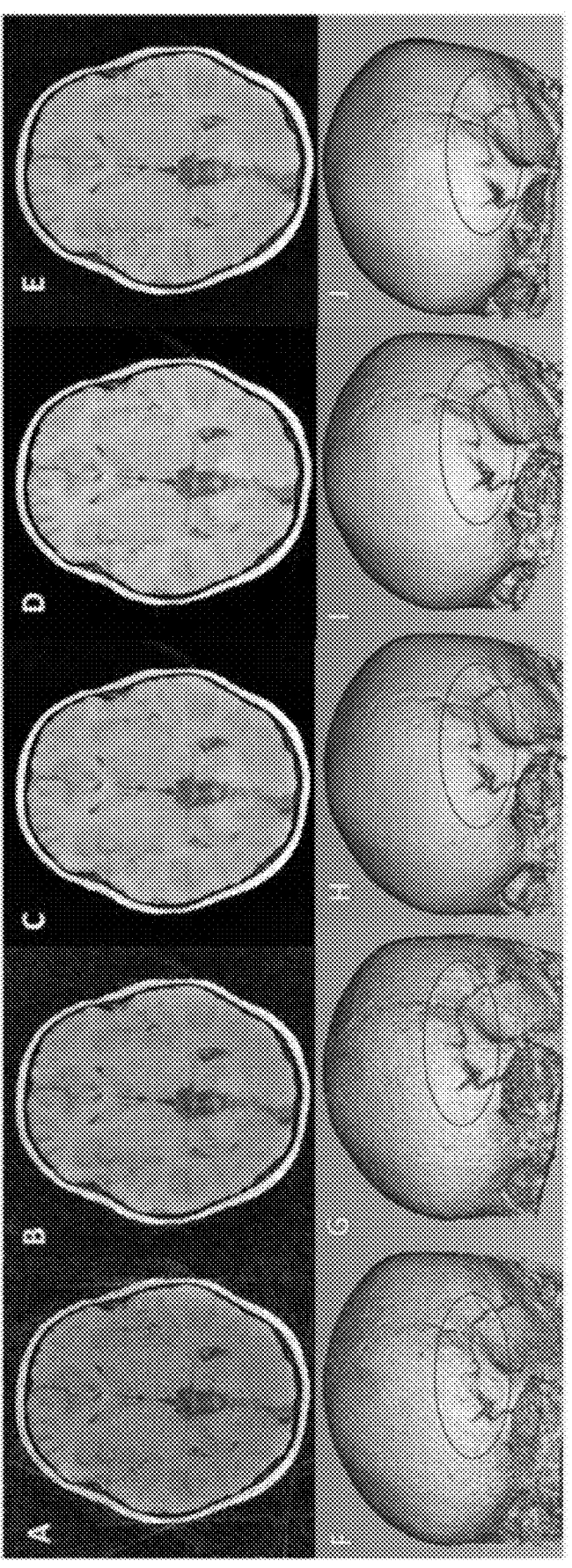
FIG. 8F illustrates volumetric and 3D rendered cranial bone images from a trauma participant with fractures (marked by yellow arrowed and red circles).

FIG. 8F illustrates volumetric and 3D rendered cranial bone images from a trauma participant with fractures (marked by yellow arrowed and red circles). Slides "A" and "F" are 1-min MCNUFFT, slides "B" and "G" are 1-min SSDU, slides "C" and "H" are 1-min un-WTL, slides "D" and "I" are 1-min WTL, and slides "E" and "J" are 5-min MCNUFFT. The skull fractures can be readily identified on 1-min WTL images similar to 5-min MCNUFFT. Moreover, the surface rendered cranial bone images from 1-min WTL shows much less noise than 1-min SSDU (marked by red arrows), better suture and fracture visualization than 1-min un-WTL (marked in red circle), and suggesting that WTL can reduce noise while preserving detailed tiny structures.

Figure 9B:
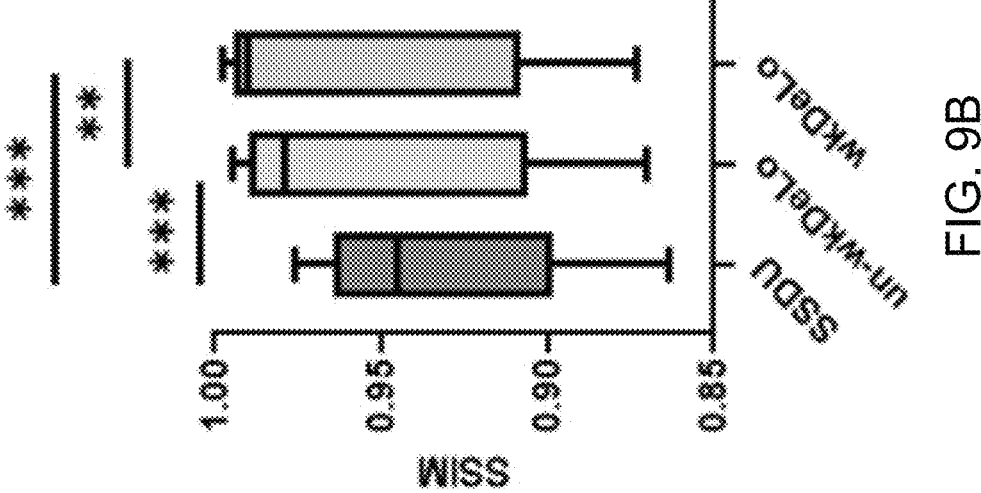
FIG. 9B illustrates the SSIM for SSDU, un-WTL, and WTL, summarizing all subjects in a box plot.
Figure 9A:
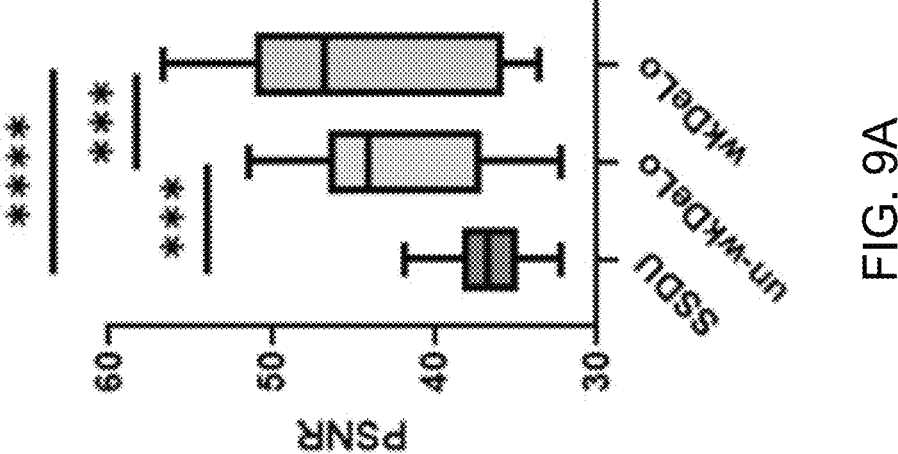
FIG. 9A illustrates the PSNR for SSDU, un-WTL, and WTL, summarizing all subjects in a box plot.

FIG. 9 illustrates the SSIM and PSNR for SSDU, un-WTL, and WTL, summarizing all subjects in a box plot. The WTL has significantly higher PSNR and SSIM than SSDU and un-WTL (P<0.001).

High-resolution MRI acquisition with sub-millimeter voxel size and whole head coverage may be lengthy. The current Golden-angle radial MR scan has an acquisition time of 5 minutes. A long scan reduces compliance in unsedated pediatric patients. However, a short MR acquisition results in under-sampled data, leading to artifacts and high noise. The full Nyquist sampling rate for the radial scan needs 502 spokes. The 5-min (400 spokes) and 1-min (80 spokes) scans correspond to 80% and 16% of Nyquist data, respectively. The WTL method described herein provides MRI reconstruction that reduces MR acquisition time. The MR 1-min scan can be used to generate high-resolution images for the application of identifying skull fractures and sutures for pediatric patients. The WTL 1-min scan closely resembled the 5-min MRI scan in terms of image quality. The results show that the WTL approach outperforms SSDU and un-WTL, a method without accounting for k-space sampling density. The results demonstrate that k-space sampling density variation may be considered in network training loss to achieve better MR reconstructions. WTL has the highest SSIM and PSNR. Moreover, WTL images preserve image sharpness, which allows discerning small structure. In this study, all MR scans were acquired using a golden angle stack-of-stars radial acquisitions. Compared to the k-space center, the outer k-space is sparsely covered. The weighted loss function compensated this k-space sampling density variations by giving more weight to high k-space in the unrolled network training. The principle of the WTL method can be extended to other k-space sampling schemes, such as spiral or variable density Cartesian acquisitions. The conventional MCNUFFT reconstruction of a radial k-space usually applies a density compensation of the k-space data before regridding and Fourier transform. Despite a conceptual similarity, WTL is fundamentally different from the density compensation in the MCNUFFT approach. In MCNUFFT, k-space density weights are applied to the acquired k-space data directly. In contrast, the k-space density weights are only included in the unrolled network training loss without changing the acquired k-space data.

As such, WTL is a fast, robust, and fully automated method to achieve high-resolution MR (e.g., 0.6×0.6×0.8 mm³) with a 1-min acquisition time for pediatric patients. WTL is promising in providing high-resolution MR images for clinical diagnosis and post-treatment follow-up for pediatric patients with head trauma or craniosynostosis.

Some additional theoretical analysis applicable to some of the embodiments described above is provided below.

Proposition 1: When the second assumption described above is satisfied, $$\mathbb{E}_{[(M'A)^H WM'A]=I} \tag{17}$$

Where the expectation is with respect to $p_M$.

Proof of Proposition 1: Since the second assumption implies that $\mathbb{E}[M']_{k,k} \neq 0$ $$\overline{w_k} = \frac{1}{\sqrt{\mathbb{E}[M'^T M']_{k,k}}} \tag{18}$$

Since $M'^T M' \in \{0, 1\}^{n \times n}$ and $\overline{W} \in \mathbb{R}^{n \times n}$ are both diagonal matrices, we have $$\mathbb{E}[M'^T WM'] = \mathbb{E}[M'^T M' \overline{W}\overline{W}^T M'^T M'] = \overline{W}\overline{W}^T \mathbb{E}[M'^T M' M'^T M'] = I. \tag{19}$$

Now the desired result is established:

$$\mathbb{E}[(M'A)^H WM'A] = A^H \mathbb{E}[M'^T WM']A = A^H A = I. \tag{20}$$

where the second equation is due to (19), and the last equation is because A is an orthogonal matrix.

Theorem 2: Under the first and second assumptions described above, the JFB update of the weighted self-supervised loss ($\ell_{self}$) is equivalent to its supervised counterpart ($\ell_{sup}$), namely we have $$\mathrm{JF}B_{\ell_{self}}(\theta) = \mathrm{JF}B_{\ell_{sup}}(\theta). \tag{21}$$

where $$\ell_{sup} = \mathbb{E}\left[\frac{1}{2}\|\bar{x} - x\|_2^2\right] \text{ and} \tag{22}$$

$$\ell_{self} = \mathbb{E}\left[\frac{1}{2}\|M'A\bar{x} - y'\|_w^2\right]. \tag{23}$$

The vector $\bar{x} = T_\theta(\bar{x}, y)$ is the fixed-point of $T_\theta$ for y.

Proof of Theorem 2. In order to simplify the notations in the following analysis, complex valued quantities are used directly and the real part is assumed to be taken at the end. The supervised update $\mathrm{JF}B_{\ell_{sup}}(\theta)$ is given by $$JFB_{\ell_{sup}}(\theta) = \mathbb{E}\left[(\nabla_\theta T_\theta(\bar{x}))^H \left[\frac{\partial \ell_{sup}}{\bar{x}}\right]^T\right] = \mathbb{E}\left[(\nabla_\theta T_\theta(\bar{x}))^H (\bar{x} - x)\right]. \tag{24}$$

On the other hand, the weighted self-supervised update can be rewritten as $\mathrm{JF}B_{\ell_{sup}}(\theta)$:

$$JFB_{\ell_{self}}(\theta) = \tag{25}$$

$$\mathbb{E}\left[(\nabla_\theta T_\theta(\bar{x}))^H \left[\frac{\partial \ell_{self}}{\partial \bar{x}}\right]^T\right] = \mathbb{E}\left[(\nabla_\theta T_\theta(\bar{x}))^H (H'^H(H'\bar{x} - \sqrt{W} y'))\right] =$$

$$\mathbb{E}\left[\mathbb{E}\left[(\nabla_\theta T_\theta(\bar{x})^H H'^H(H'\bar{x} - \sqrt{W} y')|x, M, e\right]\right] =$$

$$\mathbb{E}\left[(\nabla_\theta T_\theta(\bar{x})^H \mathbb{E}[H'^H(H'\bar{x} - \sqrt{W} y')|x, M, e]\right]$$

Where $H':=\sqrt{W}M'A$ and $\sqrt{W}$ denotes the element-wise square-root of the matrix W. The third equation is obtained by applying the law of total expectation. The last equation is true since $\nabla_\theta T_\theta(\bar{x})$ is deterministic when conditioned on x, M and e. Also $$\mathbb{E}[H'^H(H'\bar{x} - \sqrt{W} y')|x, M, e] = \tag{26}$$

$$\mathbb{E}[H'^H(H'\bar{x} - \sqrt{W} (M'Ax + e'))|x, M, e] =$$

$$\mathbb{E}[H'^H(H'(\bar{x} - x) + \sqrt{W} e')|x, M, e] =$$

$$\mathbb{E}[H'^H H'(\bar{x} - x)|x, M, e] + \mathbb{E}[H'^H \sqrt{W} e'|x, M, e].$$

Where in the second row y'=M'Ax+e'. The first term in (26) can also be expressed as $$\mathbb{E}[H'^H H'(\bar{x} - x)|x, M, e] = \mathbb{E}[H'^H H'](\bar{x} - x) = \bar{x} - x \tag{27}$$

where the second equation is due to independence of M' from x, M and e, and the last equation is due to Proposition 1. The second term of (26) can be expressed as $$\mathbb{E}[H'^H \sqrt{W} e'|x, M, e] = \mathbb{E}[H'^H \sqrt{W} e'] = \mathbb{E}[H'^H \sqrt{W}]\mathbb{E}[e'] = 0 \tag{28}$$

where the first equation is due to the independence of M' in H' and e' from x, M and e, the second equation is due to the independence of M' from e', and the last equation is due to e'~$\mathcal{N}$ (0, σ²I). Combining (25), (26), (27), and (28), results in $$JF\mathcal{B}_{\ell_{self}}(\theta) = \mathbb{E}\left[(\nabla_\theta T_\theta(\tilde{x}))^H \tilde{x} - x)\right] \qquad (29)$$

which establishes the desired result.

(29)

Figure 14:
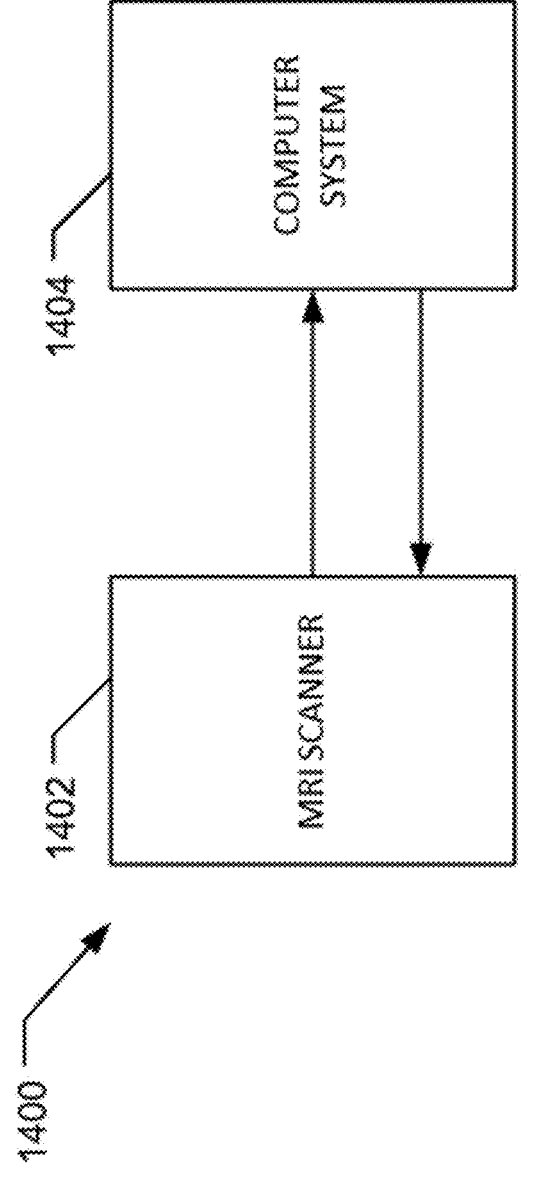
FIG. 14 is a schematic block diagram of an MRI imaging system in one aspect.

In various aspects, the methods described herein may be implemented using an MRI system. FIG. 14 is an illustration of an MRI imaging system 1400 in one aspect. As illustrated in FIG. 14, the MRI system 1400 may include an MRI scanner 1402 operatively coupled and/or in communication with a computer system 1404. In this aspect, the computer system 1404 is configured to receive data from the MRI scanner 1402, and is further configured to execute a plurality of stored executable instructions encoding one or more aspects of the MRI method as described herein above. In another aspect, the computer system 1404 may be further configured to operate the MRI scanner 1402 to obtain, for example, diffusion data by executing an additional plurality of stored executable instructions. The computer system 1404 may be located near the MRI scanner 1402 (e.g., in the same or an adjacent room) or may be remotely located from the MRU scanner (e.g., in a different building, a different city, a different country, etc.). Moreover, the computer system 1404 may include combinations of local and remote components, and may be or include a cloud computing system.

Although the present invention is described in connection with an exemplary imaging system environment, embodiments of the invention are operational with numerous other general purpose or special purpose imaging system environments or configurations. The imaging system environment is not intended to suggest any limitation as to the scope of use or functionality of any aspect of the invention. Moreover, the imaging system environment should not be interpreted as having any dependency or requirement relating to any one or combination of components illustrated in the exemplary operating environment. Examples of well-known imaging systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term "processor," as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided to enable the data processing of the MRI method as described herein above, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Washington). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

Figure 15:
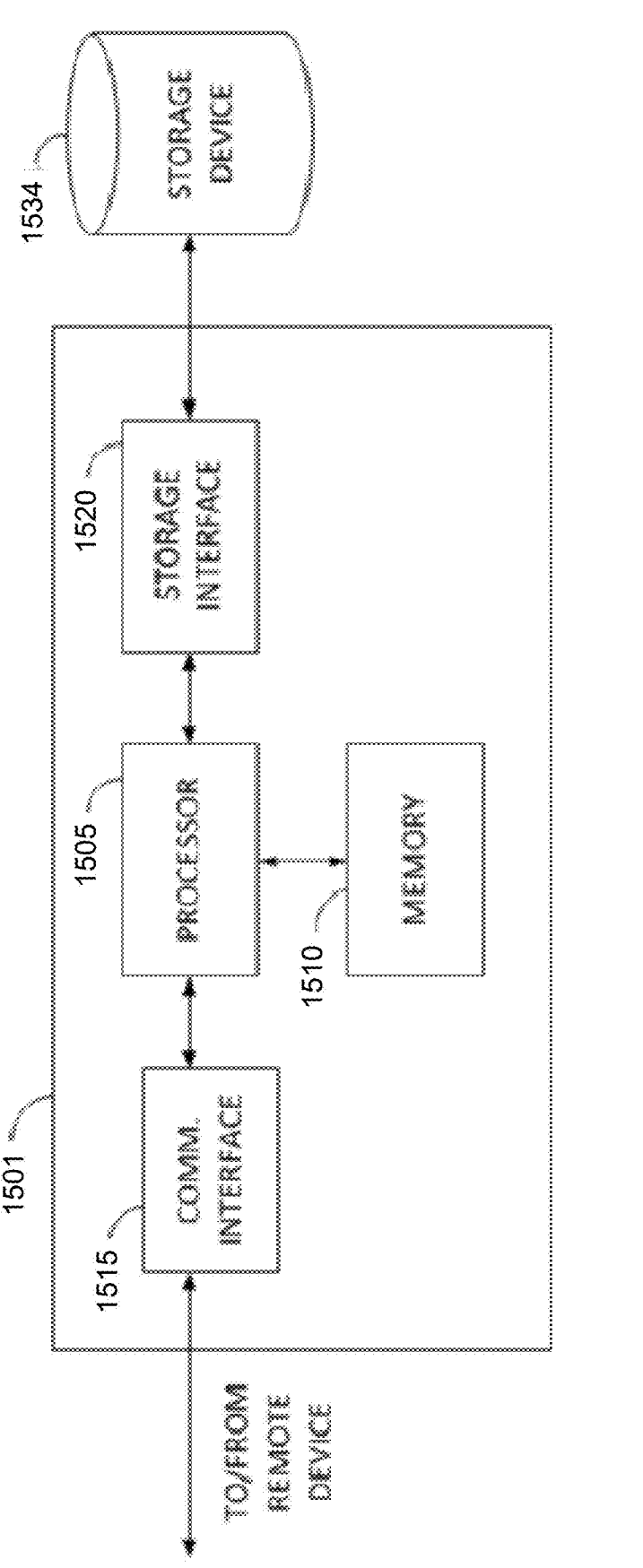
FIG. 15 is a schematic block diagram of an example server system.

In one embodiment, the computer system may be configured as a server system. FIG. 15 illustrates an example configuration of a server system 1501 used to receive measurements from the MRI scanner 1402 (not illustrated). Referring again to FIG. 15, server system 1501 may also include, but is not limited to, a database server. In this example embodiment, server system 1501 performs all of the steps used to implement the MRI imaging method as described herein above.

In this aspect, the server system 1501 includes a processor 1505 for executing instructions. Instructions may be stored in a memory area 1510, for example. The processor 1505 may include one or more processing units (e.g., in a multi-core configuration) for executing instructions. The instructions may be executed within a variety of different operating systems on the server system 1501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or any other suitable programming languages).

The processor 1505 is operatively coupled to a communication interface 1515 such that server system 1501 is capable of communicating with a remote device, such as the MRI scanner 1402, a user system, or another server system 1501. For example, communication interface 1515 may receive requests (e.g., requests to provide an interactive user interface to receive sensor inputs and to control one or more devices of system 1400 from a client system via the Internet.

Processor 1505 may also be operatively coupled to a storage device 1534. Storage device 1534 is any computer-operated hardware suitable for storing and/or retrieving data. In some embodiments, storage device 1534 is integrated in server system 1501. For example, server system 1501 may include one or more hard disk drives as storage device 1534. In other embodiments, storage device 1534 is external to server system 1501 and may be accessed by a plurality of server systems 1501. For example, storage device 1534 may include multiple storage units such as hard disks or solid state disks in a redundant array of inexpensive disks (RAID) configuration. Storage device 1534 may include a storage area network (SAN) and/or a network attached storage (NAS) system.

In some embodiments, processor 1505 is operatively coupled to storage device 1534 via a storage interface 1520. Storage interface 1520 is any component capable of providing processor 1505 with access to storage device 1534. Storage interface 1520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1505 with access to storage device 1534.

Memory area 1510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), registers, hard disk memory, a removable disk, a CD-ROM, or any other form of computer-readable storage medium known in the art. The above memory types are exemplary only, and are thus not limiting as to the types of memory usable for storage of a computer program.

Figure 16:
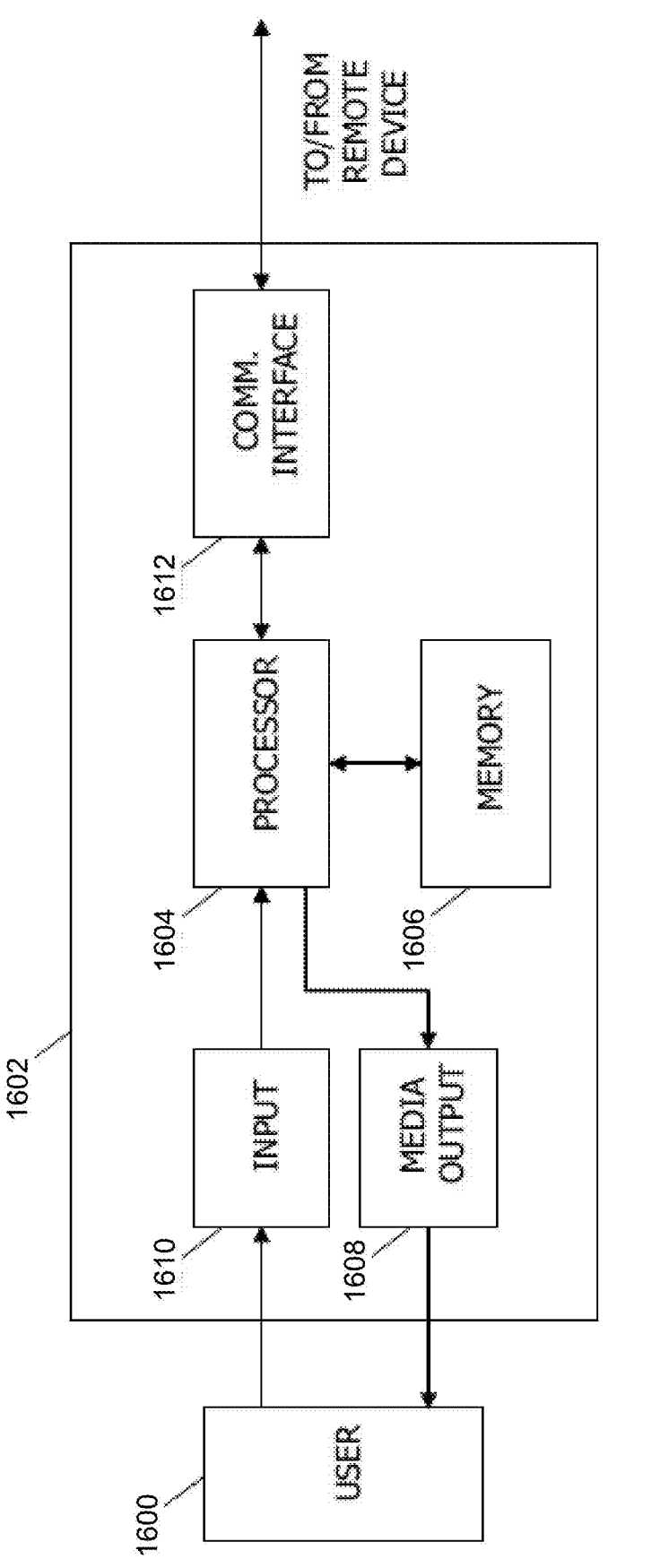
FIG. 16 is a block diagram of an example computing device.

In another embodiment, the computer system may be provided in the form of a computing device, such as a computing device 1602 (shown in FIG. 16). Computing device 1602 includes a processor 1604 for executing instructions. In some embodiments, executable instructions are stored in a memory area 1606. Processor 1604 may include one or more processing units (e.g., in a multi-core configuration). Memory area 1606 is any device allowing information such as executable instructions and/or other data to be stored and retrieved. Memory area 1606 may include one or more computer-readable media.

In another embodiment, the memory included in the computing device 1602 may include a plurality of modules. Each module may include instructions configured to execute using at least one processor. The instructions contained in the plurality of modules may implement at least part of the method for simultaneously regulating a plurality of process parameters as described herein when executed by the one or more processors of the computing device. Non-limiting examples of modules stored in the memory of the computing device include: a first module to receive measurements from one or more sensors and a second module to control one or more devices of the MRI imaging system 1400.

Computing device 1602 also includes one media output component 1608 for presenting information to a user 1600. Media output component 1608 is any component capable of conveying information to user 1600. In some embodiments, media output component 1608 includes an output adapter such as a video adapter and/or an audio adapter. An output adapter is operatively coupled to processor 1604 and is further configured to be operatively coupled to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 1602 includes an input device 1610 for receiving input from user 1600. Input device 1610 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 1608 and input device 1610.

Computing device 1602 may also include a communication interface 1612, which is configured to communicatively couple to a remote device such as server system 302 or a web server. Communication interface 1612 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory 1606 are, for example, computer-readable instructions for providing a user interface to user 1600 via media output component 1608 and, optionally, receiving and processing input from input device 1610. A user interface may include, among other possibilities, a web browser and an application. Web browsers enable users 1600 to display and interact with media and other information typically embedded on a web page or a website from a web server. An application allows users 1600 to interact with a server application.

Exemplary methods of this disclosure may be performed by the system shown in FIG. 14 and/or the computing devices shown in FIGS. 15 and 16.

Exemplary embodiments of methods, systems, and apparatus for use in diffusion basis spectrum imaging are described above in detail. The methods, systems, and apparatus are not limited to the specific embodiments described herein but, rather, operations of the methods and/or components of the systems and/or apparatus may be utilized independently and separately from other operations and/or components described herein. Further, the described operations and/or components may also be defined in, or used in combination with, other systems, methods, and/or apparatus, and are not limited to practice with only the systems, methods, and apparatus described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It will be understood by those of skill in the art that information and signals may be represented using any of a variety of different technologies and techniques. For example, data, instructions, commands, information, signals, bits, symbols, and/or chips may be represented by voltages, currents, electromagnetic waves, magnetic fields or particles, optical fields or particles, or any combination thereof. Similarly, the various illustrative logical blocks, modules, circuits, and algorithm operations described herein may be implemented as electronic hardware, computer software, or a combination of both, depending on the application and the functionality. Moreover, the various logical blocks, modules, and circuits described herein may be implemented or performed with a general purpose computer, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Exemplary general purpose processors include, but are not limited to only including, microprocessors, conventional processors, controllers, microcontrollers, state machines, or a combination of computing devices.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for image generation using a self-supervised deep learning image reconstruction model with a weighted loss function for image reconstruction in MRI applications, the system comprising:
   an MRI scanner configured to perform an MRI scan on a subject and obtain MRI data of the MRI scan; and
   a computing device including at least one processor and at least one memory, the computing device being operatively coupled to the MRI scanner, and the at least one memory storing instructions that cause the at least one processor to:
      receive the MRI data obtained by the MRI scanner;
      acquire k-space data of the received MRI data;
      perform reconstruction of an MRI image, the reconstructed MRI image being representative of a result of the MRI scan and reconstructed based on under-sampled k-space data of the acquired k-space data, the reconstruction including reconstructing the under-sampled k-space data using the weighted loss function and applying a weighted matrix to weight k-space sampling densities of the under-sampled k-space data;

generate the reconstructed MRI image at least in part from the weighted k-space sampling densities; and
      display the generated and reconstructed MRI image.

2. The system of claim 1, wherein the weighted loss function compensates for variations in the k-space sampling densities by applying (i) a first weight to lower k-space data of the acquired k-space data, and (ii) a second weight to higher k-space data of the acquired k-space data, the second weight being greater than the first weight, wherein the first weight and the second weight are applied without changing the acquired k-space data.

3. The system of claim 1, wherein a weighted loss associated with the weighted loss function is iteratively minimized during training of the self-supervised deep learning image reconstruction model.

4. The system of claim 1, wherein training of the self-supervised deep learning image reconstruction model comprises directly mapping pairs of under-sampled and noisy k-space measurements of a same object to each other without using fully-sampled groundtruth data.

5. The system of claim 1, wherein the MRI scan is performed using one of a golden angle stack-of-stars radial acquisition, a spiral acquisition, and a variable density Cartesian acquisition.

6. The system of claim 1, wherein the reconstruction via the weighted loss function is performed with an acceleration rate of 6.25× at a 16% Nyquist sampling rate.

7. The system of claim 1, wherein training of the self-supervised deep learning image reconstruction model includes running at least two consecutive steps in each training iteration.

8. The system of claim 7, wherein the at least two consecutive steps include a forward pass and a backward pass.

9. The system of claim 8, wherein the forward pass computes a fixed-point of an operator including a data consistency layer and a convolutional neural network prior.

10. The system of claim 8, wherein the backward pass comprises Jacobian-Free Backpropagation.

11. The system of claim 10, wherein the Jacobian-Free Backpropagation computes a descent direction to obtain training parameters for training of the self-supervised deep learning image reconstruction model.

12. A computer-implemented method of reconstructing an image using a self-supervised deep learning image reconstruction model with a weighted loss function in MRI applications, the method comprising:
   receiving MRI data, the MRI data resulting from an MRI scan of a subject using an MRI scanner;
   acquiring k-space data of the received MRI data;
   performing reconstruction of an MRI image, the reconstructed MRI image being representative of a result of the MRI scan and reconstructed based on under-sampled k-space data of the acquired k-space data, the performing of the reconstruction including reconstructing the under-sampled k-space data using the weighted loss function and applying a weighted matrix to weight k-space sampling densities of the under-sampled k-space data;
   generating the reconstructed MRI image at least in part from the weighted k-space sampling densities; and
   displaying the generated and reconstructed MRI image.

13. The method of claim 12, wherein a weighted loss associated with the weighted loss function is iteratively minimized during training of the self-supervised deep learning image reconstruction model.

14. The method of claim 12, wherein the weighted loss function compensates for variations in the k-space sampling densities by applying (i) a first weight to lower k-space data of the acquired k-space data, and (ii) a second weight to higher k-space data of the acquired k-space data, the second weight being greater than the first weight, wherein the first weight and the second weight are applied without changing the acquired k-space data.

15. The method of claim 12, wherein training of the self-supervised deep learning image reconstruction model comprises directly mapping pairs of under-sampled and noisy k-space measurements of a same object to each other without using fully-sampled groundtruth data.

16. One or more non-transitory computer readable storage media having computer-executable instructions embodied thereon for reconstructing an image using a self-supervised deep learning image reconstruction model with a weighted loss function in MRI applications, wherein when executed by at least one processor, the computer-executable instructions cause the at least one processor to:

receive MRI data, the MRI data resulting from an MRI scan of a subject using an MRI scanner;

acquire k-space data of the received MRI data;

perform reconstruction of an MRI image, the reconstructed MRI image being representative of a result of the MRI scan and reconstructed based on under-sampled k-space data of the acquired k-space data, the reconstruction including reconstructing the under-sampled k-space data using the weighted loss function and applying a weighted matrix to weight k-space sampling densities of the under-sampled k-space data;

generate the reconstructed MRI image at least in part from the weighted k-space sampling densities; and display the generated and reconstructed MRI image.

17. The one or more non-transitory computer-readable storage media of claim 16, wherein a weighted loss associated with the weighted loss function is iteratively minimized during training of the self-supervised deep learning image reconstruction model.

18. The one or more non-transitory computer-readable storage media of claim 16, wherein training of the self-supervised deep learning image reconstruction model comprises directly mapping pairs of under-sampled and noisy k-space measurements of a same object to each other without using fully-sampled groundtruth data.

19. The one or more non-transitory computer-readable storage media of claim 16, wherein the weighted loss function compensates for variations in the k-space sampling densities by applying (i) a first weight to lower k-space data of the acquired k-space data, and (ii) a second weight to higher k-space data of the acquired k-space data, the second weight being greater than the first weight.

20. The one or more non-transitory computer-readable storage media of claim 19, wherein the first weight and the second weight are applied without changing the acquired k-space data.

* * * * *